United States Patent
Takahashi et al.

(10) Patent No.: US 7,270,601 B2
(45) Date of Patent: Sep. 18, 2007

(54) GAME APPARATUS AND RECORDING MEDIUM HAVING GAME PROGRAM RECORDED THEREIN

(75) Inventors: Hiroyuki Takahashi, Shinjuku-ku (JP); Shugo Takahashi, Shinjuku-ku (JP); Haruki Kodera, Shinjuku-ku (JP)

(73) Assignee: Nintendo Co., Ltd., Kyoto (JP)

( * ) Notice: Subject to any disclaimer, the term of this patent is extended or adjusted under 35 U.S.C. 154(b) by 897 days.

(21) Appl. No.: 10/704,756

(22) Filed: Nov. 12, 2003

(65) Prior Publication Data
US 2004/0180709 A1    Sep. 16, 2004

(30) Foreign Application Priority Data
Mar. 10, 2003  (JP)  ............................. 2003-064072
Oct. 8, 2003  (JP)  ............................. 2003-350078

(51) Int. Cl.
*A63F 9/24* (2006.01)
(52) U.S. Cl. ............................. 463/3; 463/30; 434/252
(58) Field of Classification Search ..................... None
See application file for complete search history.

(56) References Cited

U.S. PATENT DOCUMENTS 5,146,557 A * 9/1992 Yamrom et al. ............ 715/723
5,507,485 A * 4/1996 Fisher ........................ 473/407
6,217,444 B1 * 4/2001 Kataoka et al. ................ 463/3
7,223,169 B2 * 5/2007 Imaeda et al. .................. 463/3

FOREIGN PATENT DOCUMENTS

JP   2000-157745   *   6/2000
JP   2002-52245        2/2002

OTHER PUBLICATIONS translation of JP 2000-157745 from PAJ.*

* cited by examiner

*Primary Examiner*—M. A. Sager
(74) *Attorney, Agent, or Firm*—Nixon & Vanderhye P.C.

(57) ABSTRACT

An estimated trajectory 281a, an estimated ball landing point 282a, and an estimated run range 283a are displayed in a game image 20a. The estimated ball landing point 282a is displayed as, for example, a star mark, in a game space of the game image 20a which corresponds to a terminal coordinate point on the estimated trajectory 281a. The estimated trajectory 281a is obtained for a shot at a power indicated by a power target value set by the player, and is displayed so as to extend between a current ball 22 and the estimated ball landing point 282a based on estimated trajectory data. The estimated run range 283a is displayed in the game space of the game image 20a based on estimated run range data, so as to have a shape of a rectangular area, which is divided into a plurality of equal-sized mesh parts, in accordance with geographic undulations.

22 Claims, 18 Drawing Sheets

FIG. 11

|  | ERROR RATIO | | |
|---|---|---|---|
| LIE | CHARACTER A | CHARACTER B | CHARACTER C |
| FAIRWAY | 0 % | ± 5 % | ± 1 0 % |
| SHALLOW ROUGH | ± 5 % | ± 1 0 % | ± 1 0 % |
| DEEP ROUGH | ± 1 0 % | ± 2 0 % | ± 1 0 % |
| BUNKER | ± 1 0 % | ± 2 0 % | 0 % |
| BUNKER (FRIED EGG) | ± 1 5 % | ± 3 0 % | 0 % |
| ⋮ | ⋮ | ⋮ | ⋮ |

FIG. 12

| CLUB | ERROR RATIO |
|---|---|
| 1 W | ± 3 0 % |
| 3 W | ± 2 5 % |
| 4 W | ± 2 5 % |
| 3 I | ± 2 0 % |
| 4 I | ± 1 5 % |
| ⋮ | ⋮ |

F I G. 1 7
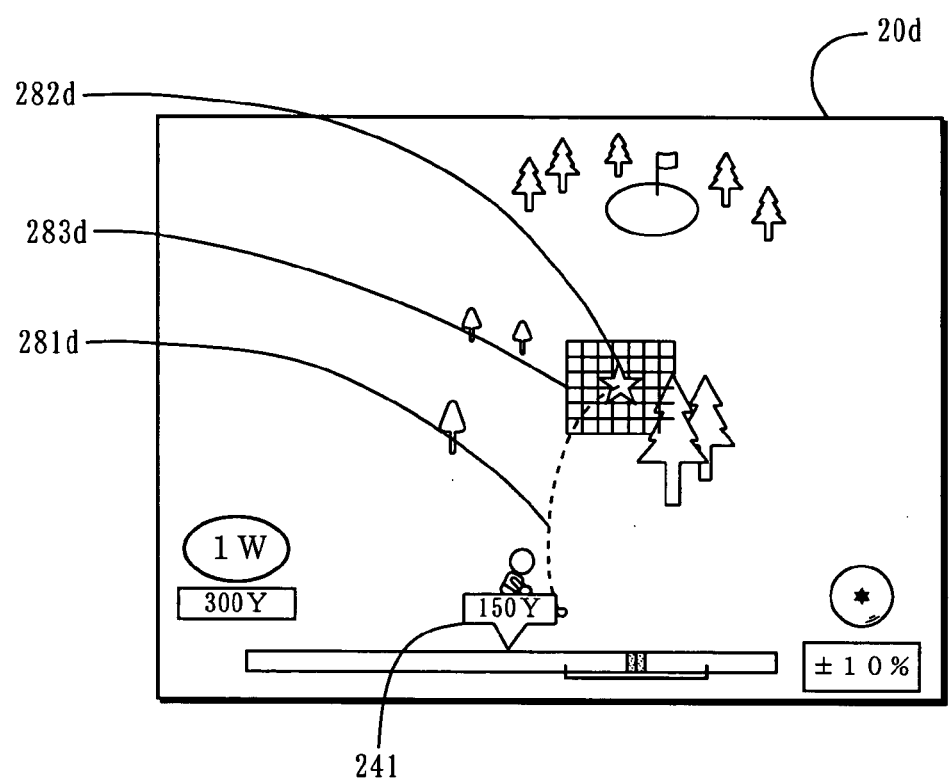

GAME APPARATUS AND RECORDING MEDIUM HAVING GAME PROGRAM RECORDED THEREIN

FIELD OF THE INVENTION

The present invention relates to a game apparatus and a recording medium having a game program recorded therein, and more particularly to a game apparatus for implementing a golf game, in which an estimated trajectory of a ball to be hit is displayed, and to a recording medium having a golf game program recorded therein.

BACKGROUND AND SUMMARY OF THE INVENTION

Conventionally, various types of game apparatuses and game programs have been developed for playing a golf game on a screen using a computer provided in a game apparatus or the like. In the golf game, the player operates a controller to select a club to be used, a power for hitting a ball (hereinafter, referred to as the "shot power"), a direction to which the ball is hit (hereinafter, referred to as the "shot direction"), a location of a point on a ball to be hit at which the club hits the ball (hereinafter, referred to as the "hit point location"), a location at which the club impacts the ball (hereinafter, referred to as the "impact location"), etc., and a shot is represented on the screen in accordance with the player's operation. In general, shot elements for representing a shot in the golf game are classified into two types, i.e., shot elements of a first type which are set before a shot operation is performed, and shot elements of a second type which are set by the shot operation. The term "shot operation" as described herein refers to the player's operation for hitting a ball. The first type includes the club to be used, the shot direction, and the hit point location. The player selectively sets the first type of shot element before the shot operation is performed, and the setting is determined as it is by starting the shot operation. The second type includes the shot power and the impact location, and is set in accordance with an operation timing at which the player conducts the shot operation. In shot processing, a ball trajectory is calculated based on the set shot elements, and a final ball reach location is determined. The term "shot processing" as described herein refers to processing performed as a result of the shot operation.

For example, as disclosed in Japanese Patent Laid-Open Publication No. 2002-52245, a golf game has been developed in which when the above-described shot elements are set before the shot operation is performed, an estimated ball reach range is obtained and displayed based on the setting of the shot elements. As a result of shot processing, the estimated ball reach range is represented by, for example, a circular region which includes an estimated ball landing point (a first point at which a ball contacts the ground after a shot), the range of the estimated ball landing point, and a run of the ball after landing (a path along which the ball runs after landing).

However, the above-described conventional technology has the following problems.

(1) In the case where there is an obstacle on a trajectory along which a ball to be hit is estimated to travel, when only the estimated ball reach range is displayed, the player cannot determine a possibility of the ball hitting the obstacle.

(2) In the case where the player hits a ball after adjusting a shot power (i.e., the player does not make a full shot using 100% power), no estimated ball reach range is displayed for the adjusted shot power, and therefore no estimated ball reach range desired by the player is known to him/her.

(3) A final ball trajectory and a ball landing point are changed in accordance with a random number value in order to add an additional game-like nature to the golf game, and therefore the ball trajectory and the ball landing point vary between shot operations even when the shot processing is repeatedly conducted with the same setting of shot elements. However, in the golf game disclosed in Japanese Patent Laid-Open Publication No. 2002-52245, only a simple estimated ball reach range is displayed. This results in the player not understanding why the ball failed to reach within the estimated ball reach range, leading to the player feeling dissatisfaction with a shot result.

SUMMARY OF THE INVENTION

Therefore, a feature of the illustrative embodiments is to solve at least one of the above-described problems by providing a game apparatus and a recording medium having a game program recorded therein capable of displaying a proper estimated reach range as well as an estimated trajectory so as to facilitate a prior estimation by the player, thereby improving the same.

The illustrative embodiments have the following primary features to attain the object mentioned above. It should be noted that reference numerals in brackets are provided in the following description in order to indicate correspondence with embodiments, which will be described for facilitating easy understanding of the present invention, rather than to limit the scope of the present invention.

A first aspect of the illustrative embodiments is directed to a game apparatus for representing on a game image a golf game which operates in accordance with a player's operation. The game apparatus includes: an input section (a controller 6); a shot element setting section (a CPU 31 performing steps S11, S20-S25, S38, S44, and S47; hereinafter, only step numbers are shown); a shot representing section (S44, S48, S49); a shot element temporary setting section (S11, S25); and an estimated trajectory display section (S12, S13, S26, S27). The input section is operated by the player. The shot element setting section sets shot elements in accordance with a prescribed operation via the input section. The shot representing section represents a game image, which shows that a ball is hit, based on the shot elements definitively set by the shot element setting section during a shot operation. The shot element temporary setting section temporarily sets at least one of the shot elements before the shot operation is performed. The estimated trajectory display section displays, in a game image (a game image 20), an estimated trajectory (an estimated trajectory 281) to a landing point of a ball to be hit, based on the at least one of the shot elements temporarily set by the shot element temporary setting section before the shot operation is performed.

As described above, in the first aspect, the estimated trajectory to the estimated ball landing point is displayed based on the shot elements temporarily set by the shot element temporary setting section. Therefore, the player can easily estimate the result of the shot operation. For example, in the case where there is an obstacle, such as a tree, in the vicinity of the estimated trajectory, the player can recognize that there is a risk that the ball might hit the tree if a shot is made based on the current settings. The trajectory of the actual shot may vary in accordance with the player's operation skill. In such a case, it is possible for the player to adopt a strategy in accordance with his/her level, e.g., the player who does not have confidence in his/her operation skill can set the estimated trajectory so as to be sufficiently away from the tree, and the player who has confidence in his/her operation skill can hit a ball so as to travel along a path of a minimum possible distance to the pin even if the tree is located close to the estimated trajectory to some degree. Accordingly, the player can determine whether there is an obstacle in the vicinity of the estimated trajectory, and therefore the player can recognize the risk in a shot. Note that the shot element temporary setting section may temporarily set shot elements at values desired by the player via the player's operation, at values predetermined by a program, or at values determined by predefined rules.

The shot elements may include first elements (a club to be used, a direction, and a hit point location), and a second shot element (power). In this case, the shot element setting section sets the first shot element before the shot operation is performed, and definitively sets the second shot element during the shot operation. The shot element temporary setting section temporarily sets the second shot element before the shot operation is performed. Accordingly, the shot element (the second shot element) definitively set during the shot operation is temporarily set before the shot operation is performed, and therefore an indeterminate element in the shot operation can be temporarily set before the shot operation is performed in order to display the estimated trajectory. The second shot element may be fixed in accordance with, for example, a timing at which the input section is operated (an A button 62 is depressed). In this case, the shot element temporary setting section temporarily and selectively sets the second shot element from among a plurality of candidates (power target values). Accordingly, regarding elements fixed in accordance with the player's operation technique during the shot operation, such elements are selectively set from among a plurality of candidates regardless of the player's technique in the stage of displaying the estimated trajectory, i.e., before the shot operation is performed. Therefore, the estimated trajectory can be readily displayed so as to correspond to settings desired by the player. The game apparatus may further include a target marker display control section (S24). The target marker display control section displays, in the game image, a target marker (a power target marker 241) indicating a timing corresponding to a candidate for the second shot element temporarily and selectively set by the shot element temporary setting section. Accordingly, an operation timing corresponding to the displayed estimated trajectory is presented to the player. Therefore, the player can recognize a timing on which the shot operation should be performed when he/she wants to adopt the estimated trajectory. The game apparatus may further include a gauge display section (a power gauge 24). The gauge display section displays, in the game image, a gauge having a longitudinal axis in one direction, and a cursor (a cursor 244) moving along the longitudinal axis of the gauge. In this case, the target marker display control section displays the target marker so as to be attached to the gauge at a location corresponding to the candidate temporarily and selectively set by the shot element temporary setting section. The shot element setting section sets the second shot element based on a location (outline arrow $A_{t2}$) of the cursor at the time the input section is operated while the cursor is moving along the longitudinal axis of the gauge. Accordingly, the shot elements, which are originally fixed in accordance with the player's skill, are estimated by means of a simpler operation. Therefore, the player can readily recognize estimated trajectories for different shots. Moreover, since the marker for indicating a target value is attached to the gauge, the player can carry out the shot operation by referencing the marker, whereby the player can aim to make the same shot as that represented by a previously estimated trajectory. The target marker indicates, for example, a target power for hitting a ball. In this case, the player can recognize estimated trajectories for shots at different powers during the shot operation.

The golf game may be carried out in a virtual three-dimensional game space. The estimated trajectory display section displays a game image (a game image 20b or 20c) obtained by moving a viewpoint of a virtual camera, which generates the game image, using the estimated trajectory as a reference in accordance with a prescribed operation via an input section (a C stick 68). In this case, the viewpoint may be placed on the estimated trajectory or at a location slightly away from the estimated trajectory (slightly above, below, or lateral to the estimated trajectory). Alternatively, the viewpoint may be manually and gradually moved in accordance with the player's operation input or may be moved automatically to a prescribed point. Accordingly, since the viewpoint from which a game space is viewed is moved along the estimated trajectory, the player can view, in a game image, the course seen from the estimated trajectory of the ball to be hit, whereby the player can confirm the detailed situation of the course in the vicinity of the estimated ball landing point. Moreover, the player can confirm the details of an obstacle located in the vicinity of the estimated trajectory, whereby it is possible to previously consider a risk of contact with that obstacle, for example.

The estimated trajectory display section may display, when an estimated trajectory (an estimated trajectory 281e) intersects an obstacle (an obstacle 29), an intersection marker at an intersection (point P) of the estimated trajectory with the obstacle. Accordingly, when the estimated trajectory intersects an obstacle, the situation of the intersection with the obstacle is also displayed, and therefore the player can plan a strategy for conquering a hole.

The shot representing section may change a ball trajectory, which is represented in the game image based on the shot elements set by the shot element setting section, within a prescribed variation range based on a random number (S39, S48). In this case, the estimated trajectory display section displays a display (an error display object 26) indicating the prescribed variation range in the game image. Accordingly, the final reach location of the ball for the shot operation is based in part on a random number, and therefore the final reach location varies between shot operations even when the shot processing is repeatedly conducted with the same setting of shot elements, thereby increasing a game-like nature. Moreover, elements which vary based on random numbers are displayed along with the estimated trajectory, and therefore the player can recognize that the estimation is not absolute, so that the player does not feel dissatisfaction with the result of the shot operation even if the actual shot draws a trajectory which is different from the estimated trajectory.

The game apparatus may further include an estimated run range display section (S12, S13, S26, S27). The estimated run range display section displays, in the game image, an estimated run range (an estimated run range 283) along which the ball travels on the ground from a landing point of the ball displayed by the estimated trajectory display section based on the shot elements temporarily set by the shot element temporary setting section when the shot operation is performed. In this case, it is possible to display a run of the ball having landed after traveling along the estimated trajectory, and therefore the player can see a final estimated range of the location where the ball will come to rest after the shot.

A second aspect of the illustrative embodiments is directed to a game apparatus for representing on a game image a game which moves an object in accordance with a player's operation. The game apparatus includes: an input section; an object movement element setting section (S11, S20-S25, S38, S44, S47); an object movement representing section (S44, S48, S49); an object movement element temporary setting section (S11, S25); and an estimated trajectory display section. The input section is operated by the player. The object movement element setting section sets object movement elements in accordance with a prescribed operation via the input section. The object movement representing section represents a game image, which shows that an object is moved, based on the object movement elements set by the object movement element setting section in an object movement operation. The object movement element temporary setting section temporarily sets at least one of the object movement elements before the object movement operation is performed. The estimated trajectory display section displays, in a game image, an estimated trajectory to a reach point of a moving object, based on the at least one of the object movement elements temporarily set by the object movement element temporary setting section before the object movement operation is performed.

Thus, even in a game where an object is moved (e.g., a fishing game, a soccer game, or a throwing game, such as a hammer throw), the game apparatus according to the second aspect can achieve effects similar to those achieved by the first embodiment by displaying the trajectory of the moving object.

A third aspect of the illustrative embodiments is directed to a computer-readable recording medium having a game program recorded therein, where the game program is implemented by a computer so as to represent on a game image a golf game which operates in accordance with a player's operation. The game program causes the computer to perform: a shot element setting step (S11, S20-S25, S38, S44, S47); a shot representing step (S44, S48, S49); a shot element temporary setting step (S11, S25); and an estimated trajectory display step (S12, S13, S26, S27). The shot element setting step sets shot elements in accordance with a prescribed operation via an input section (the controller 6) operated by the player. The shot representing step represents a game image, which shows that a ball is hit, based on the shot elements definitively set by the shot element setting step during a shot operation. The shot element temporary setting step temporarily sets at least one of the shot elements before the shot operation is performed. The estimated trajectory display step displays, in the game image, an estimated trajectory to a landing point of a ball to be hit, based on the at least one of the shot elements temporarily set by the shot element temporary setting step before the shot operation is performed.

Thus, the recording medium storing the game program can achieve effects similar to those achieved by the game apparatus according to the first or second embodiment, even when the game program is implemented by a computer.

The shot elements may include first and second shot elements. In this case, the shot element setting step sets the first shot element before the shot operation is performed, and definitively sets the second shot element during the shot operation. The shot element temporary setting step temporarily sets the second shot element before the shot operation is performed. The second shot element maybe fixed in accordance with, for example, a timing at which the input section is operated. In this case, the shot element temporary setting step temporarily and selectively sets the second shot element from among a plurality of candidates. The game program may further cause the computer to perform a target marker display control step (S13, S24). The target marker display control step displays, in the game image, a target marker indicating a timing corresponding to a candidate for the second shot element temporarily and selectively set by the shot element temporary setting step. The game program may further cause the computer to perform a gauge display step (the power gauge 24) The gauge display step displays, in the game image, a gauge having a longitudinal axis in one direction, and a cursor moving along the longitudinal axis of the gauge. The target marker display control step displays the target marker so as to be attached to the gauge at a location corresponding to the candidate temporarily and selectively set by the shot element temporary setting step. In this case, the shot element setting step sets the second shot element based on a location of the cursor at the time the input section is operated while the cursor is moving along the longitudinal axis of the gauge. The target marker may indicate, for example, a target power for hitting a ball.

The golf game may be carried out in a virtual three-dimensional game space. The estimated trajectory display step displays a game image obtained by moving a viewpoint of a virtual camera, which generates the game image, using the estimated trajectory as a reference in accordance with a prescribed operation via the input section.

The estimated trajectory display step may display, when the estimated trajectory intersects an obstacle, an intersection marker at an intersection of the estimated trajectory with the obstacle.

The shot representing step may change a ball trajectory, which is represented in the game image based on the shot elements set by the shot element setting step, within a prescribed variation range based on a random number. In this case, the estimated trajectory display step displays a display indicating the prescribed variation range in the game image.

The recording medium may further cause the computer to perform an estimated run range display step (S12, S13, S26, S27). The estimated run range display step displays, in the game image, an estimated run range along which the ball travels on the ground from a landing point of the ball displayed by the estimated trajectory display section based on the shot elements temporarily set by the shot element temporary setting step before the shot operation is performed.

A fourth aspect of the present invention is directed to a computer-readable recording medium having a game program recorded therein, where the game program is implemented by a computer so as to represent on a game image a game in which an object is moved in accordance with a player's operation. The game program causes the computer to perform: an object movement element setting step (S11, S20-S25, S38, S44, S47); an object movement representing step (S44, S48, S49); an object movement element temporary setting step (S11, S25); and an estimated trajectory display step. The object movement element setting step sets object movement elements in accordance with a prescribed operation via an input section performed by the player. The object movement representing step represents a game image, which shows that an object is moved, based on the object movement elements set by the object movement element setting step in an object movement operation. The object movement element temporary setting step temporarily sets at least one of the object movement elements before the object movement operation is performed. The estimated trajectory display step displays, in the game image, an estimated trajectory to a reach point of a moving object, based on the at least one of the object movement elements temporarily set by the object movement element temporary setting step before the object movement operation is performed.

Thus, the recording medium storing the game program can achieve effects similar to those achieved by the game apparatus according to the first or second embodiment.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 illustrates an exemplary error ratio table indicating an error ratio set for each combination of characters and lies;

FIG. 12 illustrates an exemplary error ratio table indicating an error ratio set for each club number;

FIG. 17 illustrates an example of a game image 20d obtained by changing a power target value for the game image 20b illustrated in FIG. 15;

DESCRIPTION OF THE PREFERRED EMBODIMENTS

Figure 1:
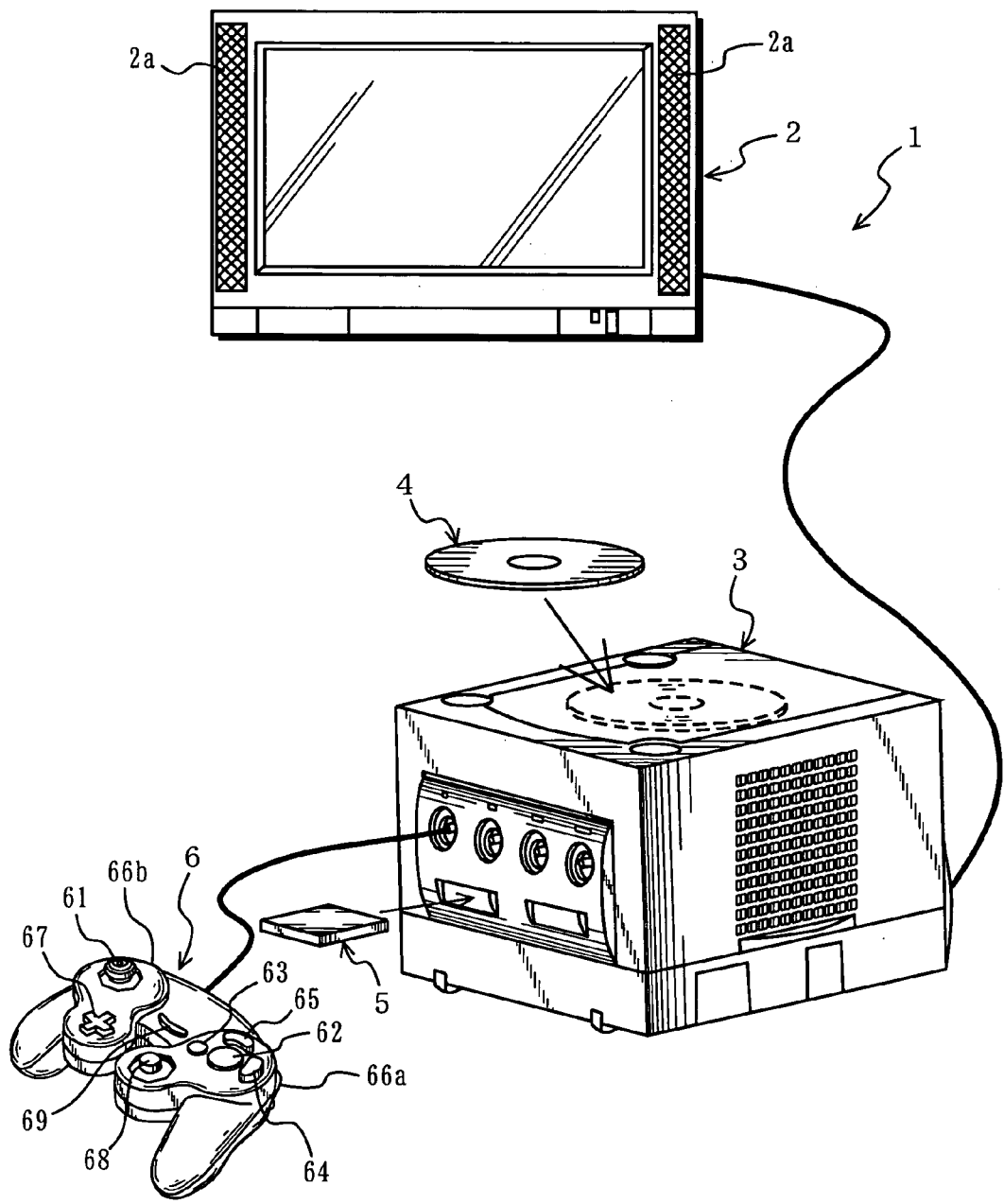
FIG. 1 is an external view for explaining a game system according to an embodiment of the present invention.

Hereinafter, an exemplary embodiment of the present invention will be described by taking a nonportable game apparatus as an example. Referring to FIG. 1, a game system 1 according to an embodiment of the present invention is described. FIG. 1 is an external view for explaining the game system 1.

In FIG. 1, the game system 1 includes a nonportable game apparatus 3 (hereinafter, simply referred to as the "game apparatus 3") connected via a connection cord to a cathode ray tube (CRT) display 2, such as a household television receiver, (hereinafter, referred to as the "television 2") including a set of loudspeakers 2a. The game apparatus 3 includes a controller 6 connected thereto via a connection cord and an optical disc 4 which is an example of information recording media removable from the game apparatus 3. Further, a memory card 5, which has a backup memory or the like incorporated therein for storing save data, etc., in a non-volatile manner, is detachably loaded into the game apparatus 3 as necessary. The game apparatus 3 implements a game program stored in the optical disc 4 to display the result of game processing as a game image on the television 2. Further, the game apparatus 3 uses the save data stored in the memory card 5 to reproduce a game state implemented in the past and display the game image on the television 2. The player of the game apparatus 3 can enjoy the progress of the game by operating the controller 6 while viewing the game image displayed on the television 2. In the present embodiment, the game program is stored in the optical disc 4. However, the present invention is not limited to this, and the game program may be supplied to the game apparatus 3 via any other computer-readable recording medium such as a memory card. Alternatively, the game program may be supplied to the game apparatus 3 via a transmission medium, such as the Internet or a communication cable. Alternatively still, the game program may be prestored in a storage means within the game apparatus 3.

As described above, the controller 6 is connected to the game apparatus 3 via a connection cord which is detachable from the game apparatus 3. Specifically, the controller 6 is an operating means for mainly operating a player object which appears in a game space displayed on the television 2 (and which is typically a main character of the game which is an operation target of the player). The controller 6 includes a plurality of input portions, such as operating buttons, keys, and sticks. More specifically, the controller 6 includes: grip portions held by the player; a main stick 61 and a cross key 67 which are operable by, for example, the player's left thumb; a C stick 68, an A button 62, a B button 63, an X button 64, a Y button 65, and a start-pause button 69 which are operable by, for example, the player's right thumb. The controller 6 further includes an R button 66a and an L button 66b which are operable by, for example, the player's right and left index fingers, respectively.

For example, in the case of operating the controller 6 to play a golf game as described later, an instruction about a shot direction is provided by moving the main stick 61 right or left and a club to be used is selected by moving the main stick 61 up or down. The C stick 68 is moved up, down, right, or left to provide an instruction to move a viewpoint in a game space. An instruction about a hit point location of a ball to be hit is provided by pressing up, down, right, or left of the cross key 67. The A button 62 is used for setting shot movement of the player object in the game space, e.g., a start of the shot operation, a shot power, an impact location, etc, are determined. The R button 66a and the L button 66b are used for adjusting a target value of the player's shot power in the case where the target value is set before the shot operation is performed. The R button 66a is operated to increase the power indicated by the target value, and the L button 66b is operated to decrease the power indicated by the target value. Other input portions may be used during the progress of the game as described later, but are not directly related to the description of the present invention, and therefore a detailed description of the other input portions is omitted.

Figure 2:
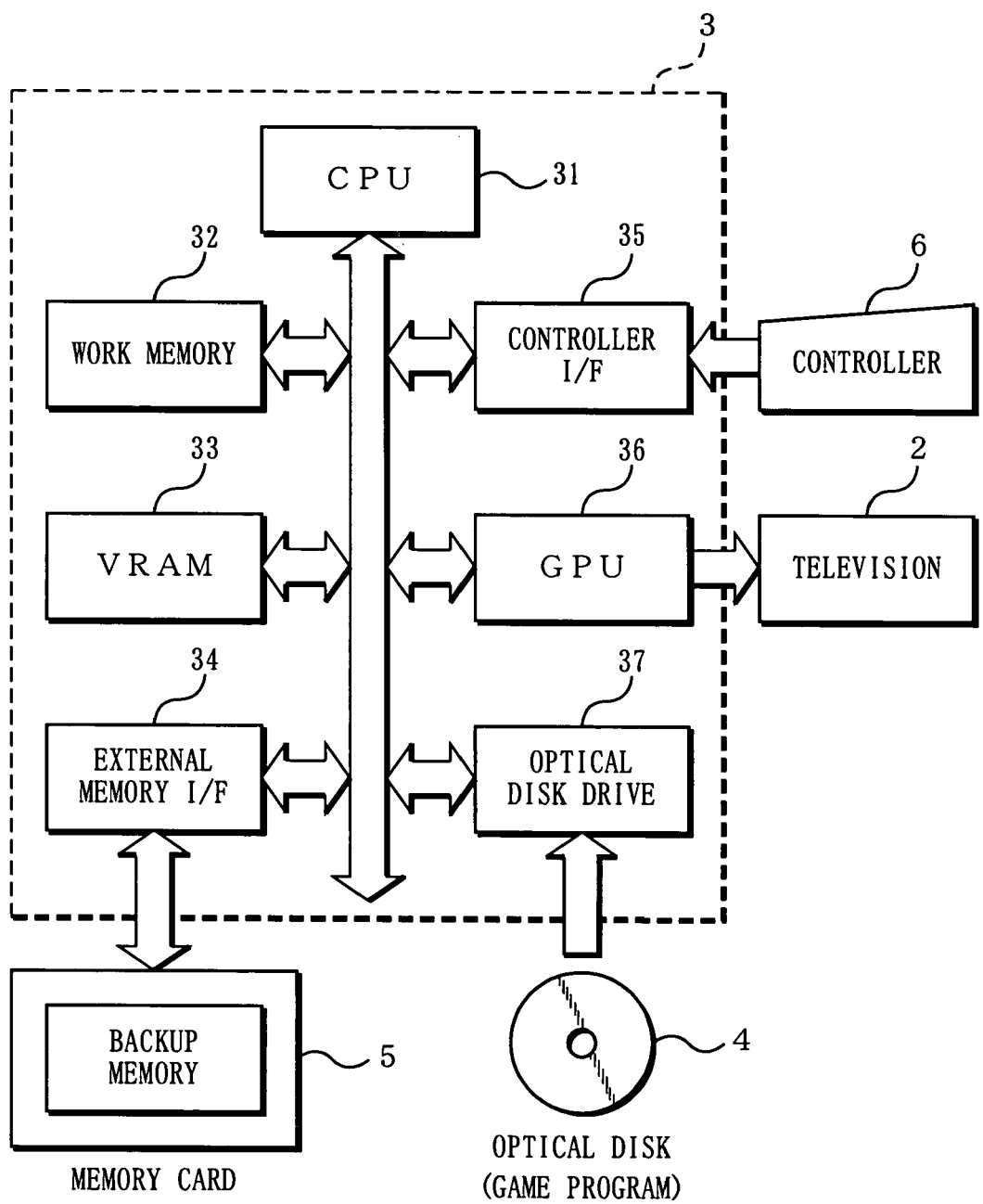
FIG. 2 is a functional block diagram of a game apparatus 3 illustrated in FIG. 1.

Referring to FIG. 2, a configuration of the game apparatus 3 will now be described. FIG. 2 is a functional block diagram of the game apparatus 3.

In FIG. 2, the game apparatus 3 includes a central processing unit (CPU) 31 of, for example, 128 bits for implementing various types of programs. For example, the CPU 31 implements a startup program stored in a boot ROM (not shown) to initialize a memory, such as a work memory 32, and thereafter the CPU 31 implements a game program stored in the optical disc 4 and performs game processing in accordance with the game program. The CPU 31 is connected via a prescribed bus to the work memory 32, a video RAM (VRAM) 33, an external memory interface (I/F) 34, a controller I/F 35, a graphics processing unit (GPU) 36, and an optical disc drive 37.

The work memory 32 is a storage area used by the CPU 31 and suitably stores a game program or the like required for processing by the CPU 31. For example, the work memory 32 stores a game program and a variety of types of data read by the CPU 31 from the optical disc 4. The game program and the variety of types of data stored in the work memory 32 are implemented by the CPU 31. The VRAM 33 stores game image data to be displayed on the television 2. The external memory I/F 34 is engaged with the memory card 5 via a connector (not shown), so that the game apparatus 3 and the memory card 5 can communicate with each other. The CPU 31 accesses the backup memory included in the memory card 5 via the external memory I/F 34. The controller I/F 35 can be connected to a plurality of external devices (not shown) via a plurality of connectors, so that the plurality of external devices and the game apparatus can communicate with each other. For example, the controller 6 is engaged with one of the plurality of connectors via a connection cord, so that the controller 6 is connected to the game apparatus 3 via the controller I/F 35. For example, the GPU 36 is a semiconductor chip for performing arithmetic processing required for displaying 3D graphics, and further processes data for a game image processed by the CPU 31 to display the game image on the television 2. The optical disc drive 37 reads data stored in the optical disc 4 placed in a prescribed read position, and outputs the read data over the bus of the game apparatus 3.

Figure 3:
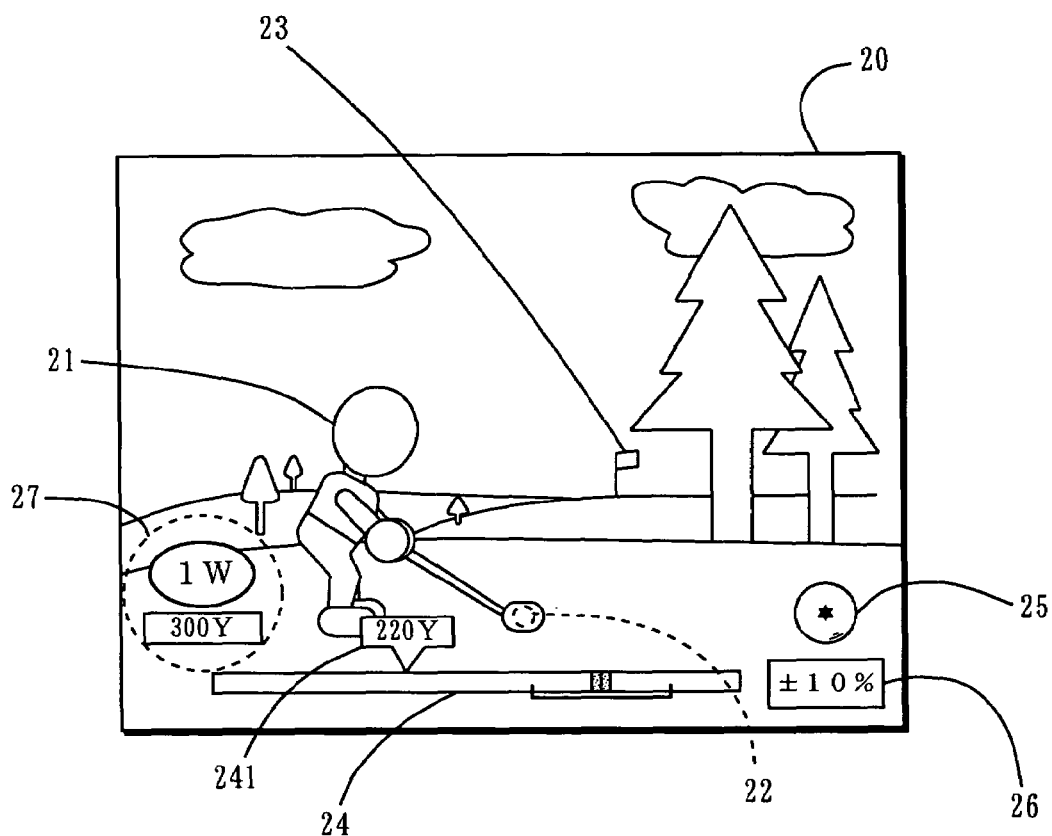
FIG. 3 illustrates an example of a game image 20 of a golf game displayed on a television 2 based on a golf game program implemented by the game apparatus 3 illustrated in FIG. 1.

Referring to FIG. 3, described next is an example of a golf game implemented by the game apparatus 3 based on a golf game program stored in the optical disc 4. FIG. 3 illustrates an example of a game image 20 of the golf game displayed on the television 2 based on the golf game program implemented by the game apparatus 3. The game image 20 shows a shot movement of a player object 21 operated by the player as a screen image viewed from behind the player object 21. An image (hereinafter, referred to as the "background image") of a hole currently played in the game is displayed in front of the player object 21, and the golf game is made to progress when the player of the game apparatus 3 hits a ball 22 toward a pin 23 depicted in the background image.

In this golf game, the player operates the controller 6 to select a club to be used, a shot power for the ball 22, a shot direction of the ball 22, a hit point location, an impact location, etc, and a shot is represented on the screen in accordance with the player's selection. As described above in conjunction with the conventional golf game, shot elements for representing a shot in the golf game are classified into two types, i.e., shot elements of a first type which are set before a shot operation is performed, and shot elements of a second type which are set by the shot operation. The first type includes a club to be used, a shot direction, and a hit point location. The first type is selectively set by the player before the shot operation is performed, and the setting is determined as it is by starting the shot operation. The second type includes a shot power and an impact location, and is set in accordance with an operation timing at which the player conducts the shot operation. The shot power is a shot element set by the shot operation, and a target value for the shot power can be selectively set by the player the shot operation is performed.

In the shot processing, a trajectory of the ball 22 is calculated based on the set shot elements, and then a final reach location of the ball 22 is determined. The shot elements are displayed as a power gauge 24, a hit point object 25, an error display object 26, and a selected club display object 27 so as to overlap with the background image. Regarding the club selected by the player for use in a shot, the selected club display object 27 is displayed for indicating a club number and a typical distance for a shot when the selected club is used. Regarding the shot direction set by the player, the background image is moved right or left with respect to the player to represent a target direction. The hit point location of the ball 22 to be hit set by the player is indicated by a star mark on the hit point object 25 having a ball-like shape. The star mark indicating the hit point location is moved in accordance with the player's operation. The shot power and the impact location, which are determined in accordance with an operation timing at which the player conducts the shot operation, are indicated by the power gauge 24 as a result of cursor movement within the power gauge 24 which will be described later. The target value of the shot power, which is set by the player when the shot operation is performed, is displayed by a power target marker 241 attached to the power gauge 24.

Referring to FIGS. 4A-4D and 5A-5E, a cursor movement within the power gauge 24 in the shot operation of the golf game will now be described. In the present embodiment, the player operates an operation button (specifically, the A button 62) three times in a single shot operation. The first operation is a shot start operation, the second operation is a power determination operation, and the third operation is an impact location determination operation. FIGS. 4A-4D are schematic diagrams illustrating cursor movement within the power gauge 24 when only the shot start operation is performed in the shot operation, i.e., when the A button 62 is operated only once. FIGS. 5A-5E are schematic diagrams for explaining cursor movement within the power gauge 24 when the shot start operation, the power determination operation, and the impact location determination operation are performed, i.e., when the A button 62 is operated three times to properly perform the shot operation. In each of FIGS. 4A-4D and 5A-5E, the illustration of the above-described power target marker 241 is omitted, solid arrows indicate movements of the cursor 244, and outline arrows indicate locations of the cursor 244 at the time the A button 62 is operated.

In FIGS. 4A-4D, the power gauge 24 is displayed so as to extend right and left along its longitudinal direction, and the cursor 244 moves right and left within the power gauge 24. The power gauge 24 has a left end 24e, and a hit area 242 is displayed at a prescribed location in a right half portion of the power gauge 24. A square hit point 243 is displayed in the center of the hit area 242 along a horizontal direction.

Figure 4A:
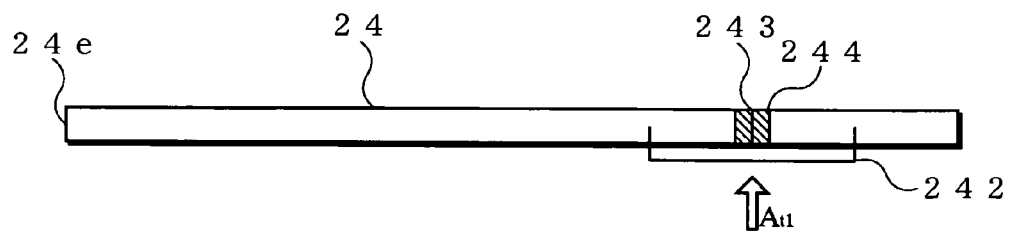
FIGS. 4A-4D are schematic diagrams illustrating cursor movement within a power gauge 24 illustrated in FIG. 3 when only a shot start operation is performed.

FIG. 4A illustrates the state of the power gauge 24 before the shot start operation is performed. In the cursor 244 before the shot start operation is performed, the square hit point 243 lies at the center of the cursor 244 standing still. In the golf game, when the player depresses the A button 62 in the state where the cursor 244 is located at the square hit point 243 (outline arrow $A_{t1}$ indicates the location of the cursor 244), the shot processing is started.

Figure 4B:
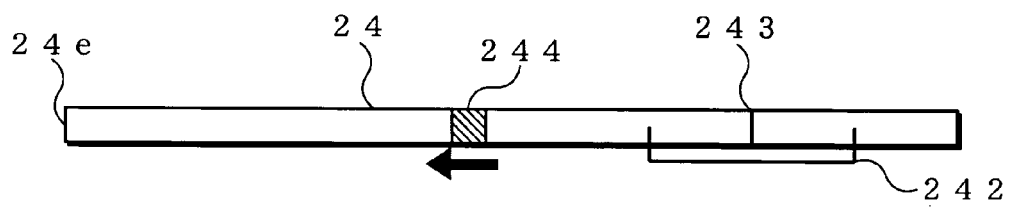
Figure 4C:
Figure 4D:
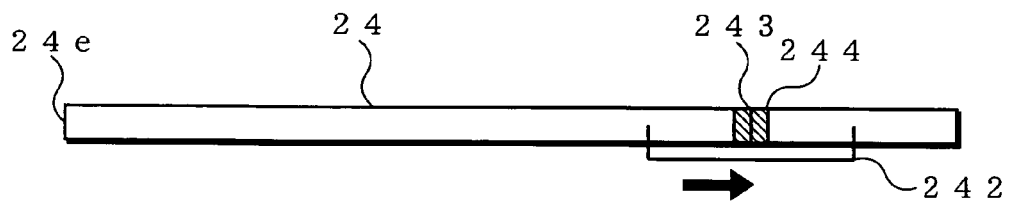

When the shot start operation is performed, the cursor 244 moves left at a prescribed speed from the square hit point 243 toward the left end 24e within the power gauge 24 (the state illustrated in FIG. 4B). In the case where the cursor 244 reaches the left end 24e of the power gauge 24 without the player performing a power determination operation which will be described later (the state illustrated in FIG. 4C), the moving direction of the cursor 244 is reversed, and then the cursor 244 moves right at the prescribed speed. Then, when the cursor 244 reaches the square hit point 243 of the power gauge 24 without the player performing the power determination operation, the cursor 244 stops moving such that the square hit point 243 lies at the center of the cursor 244 (the state illustrated in FIG. 4D). The state illustrated in FIG. 4D is the same as that illustrated in FIG. 4A. In this state, if no operations other than the shot start operation has been performed yet, the shot processing is considered as being a failure, and the shot start operation needs to be performed again.

Figure 5A:
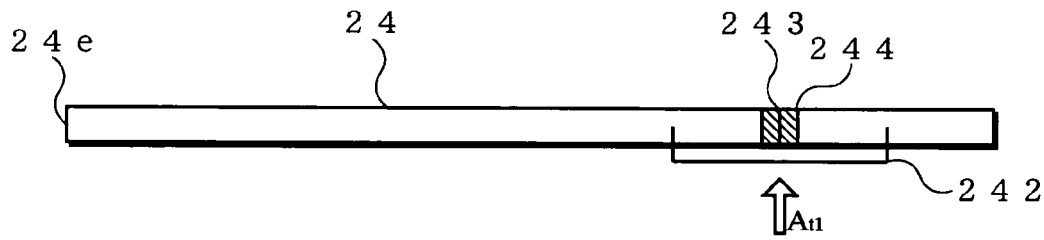
FIGS. 5A-5E are schematic diagrams for explaining cursor movement within the power gauge 24 illustrated in FIG. 3 when processing is performed until the completion of an impact operation.

Referring to FIGS. 5A-5E, described next is the cursor movement within the power gauge 24 when the shot start operation, the power determination operation, and the impact location determination operation are performed. Note that each of the power determination operation and the impact location determination operation is also performed when the player depresses the A button 62. Similar to FIG. 4A, FIG. 5A illustrates the state of the power gauge 24 before the shot start operation is performed. When the player depresses the A button 62 (outline arrow $A_{t1}$ indicates a cursor location), the shot operation is started.

Figure 5B:
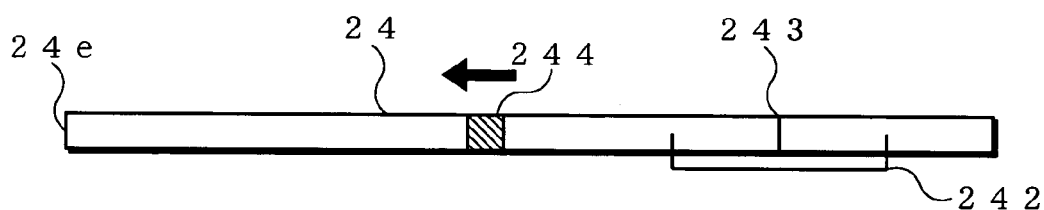
Figure 5C:
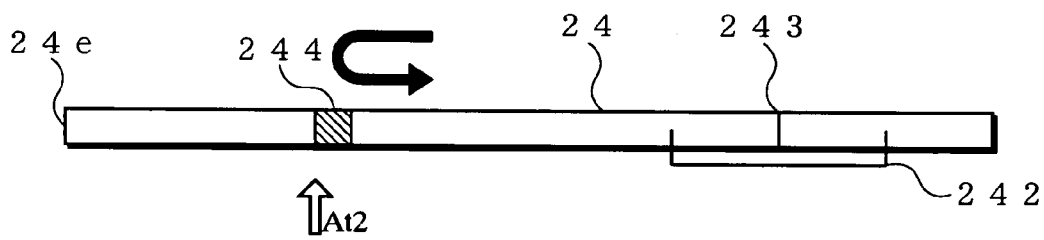

When the shot start operation is performed, the cursor 244 moves left at a prescribed speed from the square hit point 243 toward the left end 24e within the power gauge 24 (the state illustrated in FIG. 5B). When the player depresses the A button 62 before the cursor 244 reaches the left end 24e of the power gauge 24 (outline arrow $A_{t2}$ shown in FIG. 5C indicates a cursor location), the shot power is set at the location of the cursor 244 (the state illustrated in FIG. 5C), and the moving direction of the cursor 244 is reversed. Then, the cursor 244 moves right at the prescribed speed. The shot power, which is set in accordance with the location of the cursor 244, becomes larger as the location of the cursor 244 at the time the A button 62 is depressed becomes closer to the left edge 24e, i.e., 100% power is set by depressing the A button 62 when the cursor 24 lies at the left edge 24e. The power to be set is decreased at a prescribed rate as the cursor 244 moves right away from the left edge 24e.

Figure 5D:
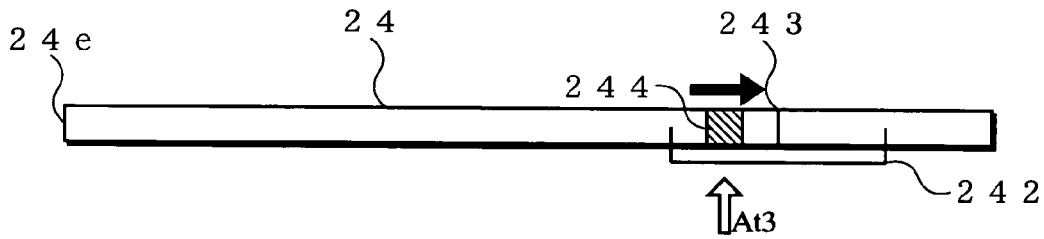

After the power determination operation is performed, the impact location for a shot is determined when the player depresses the A button 62 while the cursor 244 is moving right at the prescribed speed. For example, as illustrated in FIG. 5D, in the case where the A button 62 is depressed at the time the cursor 244 is located within the hit area 242 (outline arrow $A_{t3}$ indicates the location of the cursor 244), the ball 22 is considered as having been struck by the club. In the case where the A button 62 is depressed at the time the cursor 244 lies over the square hit point 243, the ball 22 is considered as having been struck at its center by the center of the club, and therefore the shot is represented such that the ball 22 flies toward the shot direction preset before the shot operation is performed. In the case where the A button 62 is depressed at the time the cursor 244 does not lie at the square hit point 243, for example, when the cursor 244 lies left of the square hit point 243, the shot is represented such that the ball 22 goes slicing off from the shot direction to the right, and when the cursor 244 lies right of the square hit point 243, the shot is represented such that the ball 22 goes hooking off from the shot direction to the left.

Figure 5E:
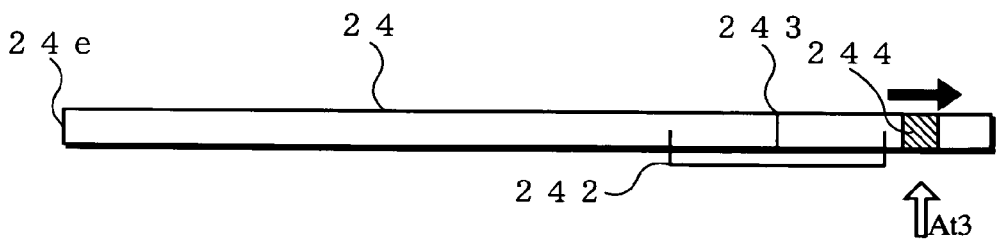

As illustrated in FIG. 5E, in the case where the A button 62 is depressed at the time the cursor 244 lies outside of the hit area 242 (outline arrow $A_{t3}$ indicates the location of the cursor 244) or in the case where the cursor 244 has reached the right end of the power gauge 24 without the impact location determination operation being performed, the ball 22 is considered as having been missed by the club, and therefore the shot is represented as a duffed shot or an air shot.

Figure 6:
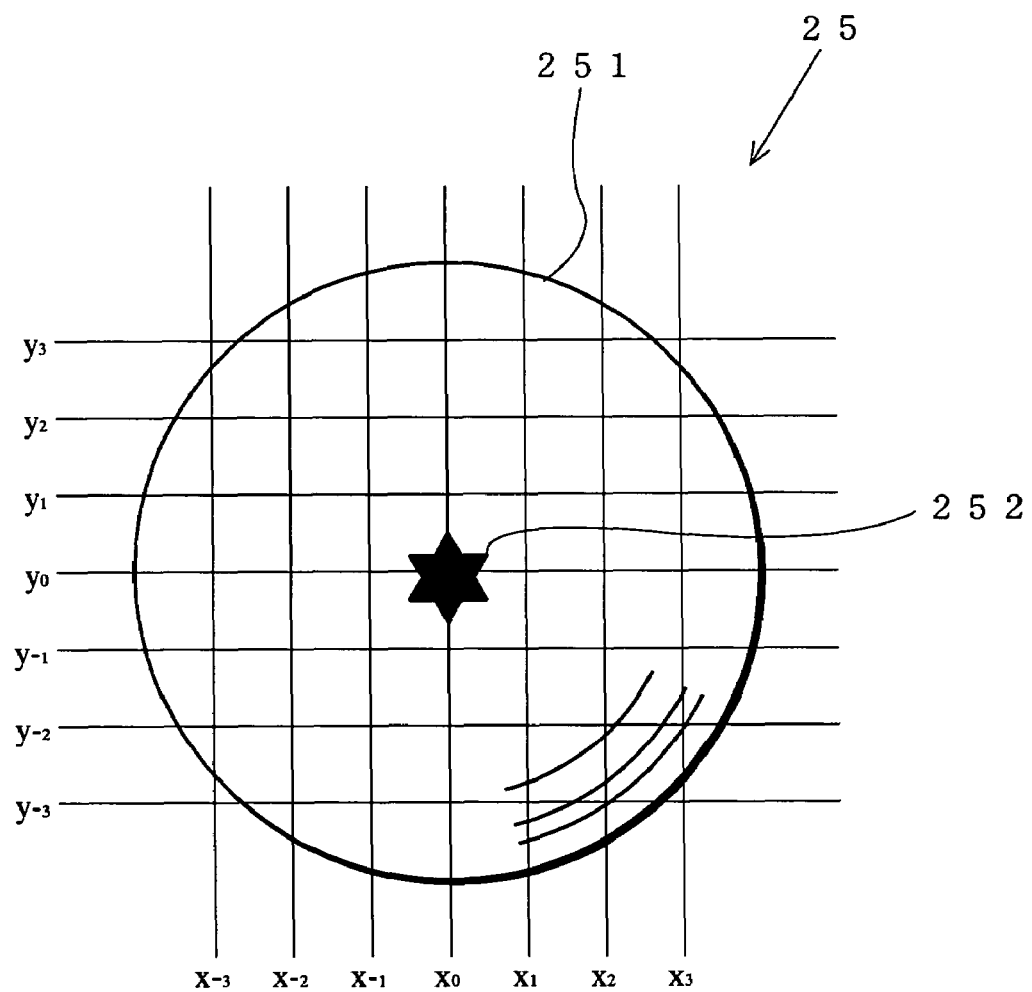
FIG. 6 is a schematic diagram for explaining hit points represented by a hit point object 25 illustrated in FIG. 3.

Referring to FIG. 6, the hit point object 25 will now be described. FIG. 6 is a schematic diagram for explaining hit points represented by the hit point object 25.

In FIG. 6, the hit point object 25 includes a ball object 251 having a ball-like shape and a hit point location object 252 displayed on the ball object 251 for indicating a hit point location of the ball 22 to be hit set by the player. The player operates the cross key 67 before the shot operation is performed, in order to set a hit point location of the ball 22. For example, seven hit point locations are set at intersections between each horizontal line and vertical lines, so that forty-nine hit point locations can be set in total. In the hit point object 25, each of the hit point locations is set as a fixed coordinate point on the hit point object 25. For example, a coordinate in a horizontal direction is set within the range from $x_{-3}$ to $x_3$, where coordinate $x_0$ is located at the center, and a coordinate in a vertical direction is set within the range from $y_{-3}$ to $y_3$, where coordinate $y_0$ is located at the center. The hit point location object 252 is moved by a point between coordinates $x_{-3}$ and $x_3$ when the player presses right or left of the cross key 67, while being moved by a point between coordinates $y_{-3}$ and $y_3$ when the player presses up or down of the cross key 67.

In the shot processing, the trajectory of the ball 22 varies in accordance with the hit point location set by the player. For example, when the hit point location object 252 is set on the left side relative to the center (coordinates $(x_0, y_0)$) of the ball object 251, the ball 22 draws a trajectory so as to go slicing off to the right, and when the hit point location object 252 is set on the right side, the ball 22 draws a trajectory so as to go hooking off to the left. When the hit point location object 252 is set above the center of the ball object 251, the ball 22 follows a low trajectory, and when the hit point location object 252 is set below the center, the ball 22 follows a high trajectory. Variation in a trajectory becomes greater as the hit point location object 252 deviates from the center (coordinates $(x_0, y_0)$) of the ball object 251.

In the shot processing, a distance for which the ball 22 runs after landing also varies in accordance with the hit point location set by the player. When the hit point location object 252 is set above the center ((coordinates $(x_0, y_0)$) of the ball object 251, the ball 22 runs for a long distance, and when the hit point location object 252 is set below the center, the ball 22 runs for a short distance. Variation in a distance for which the ball 22 runs becomes greater as the hit point location object 252 deviates from the center (coordinates $(x_0, y_0)$) of the ball object 251. When the hit point location is set at a point significantly away from the center downwards, backspin is applied to the ball 22 after landing, so that the ball 22 maybe represented as running from the landing point backwards.

Figure 7:
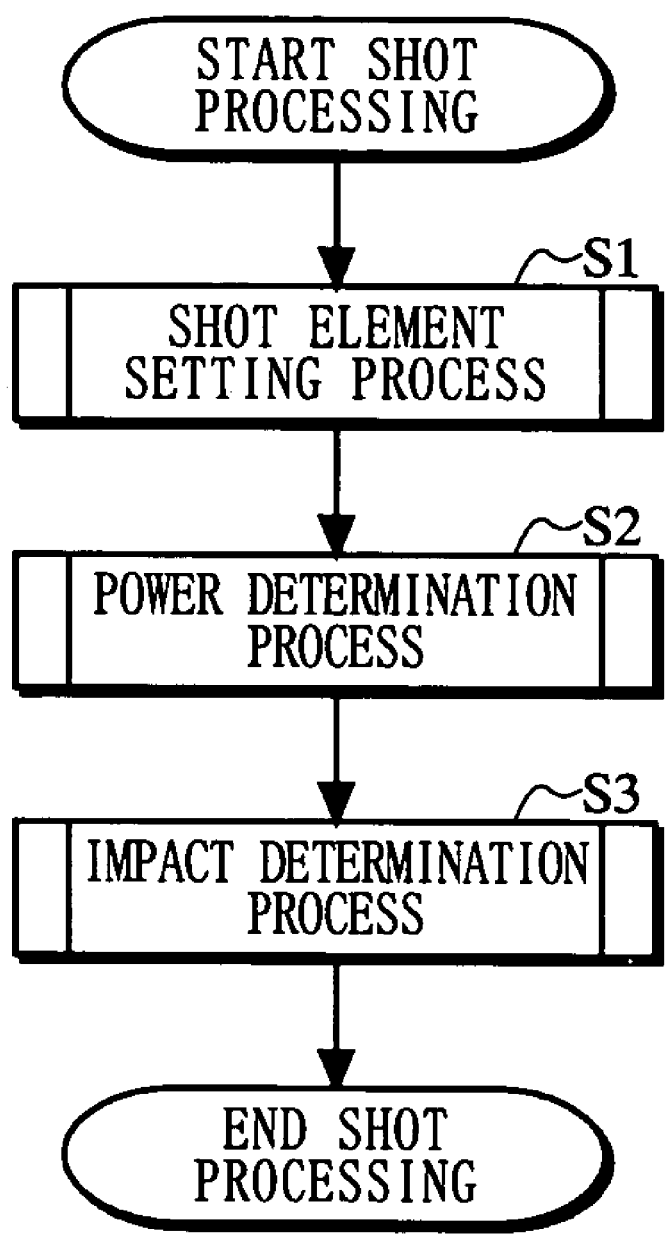
FIG. 7 is a flowchart illustrating the entire process of shot processing implemented by the game apparatus of FIG. 1.
Figure 8:
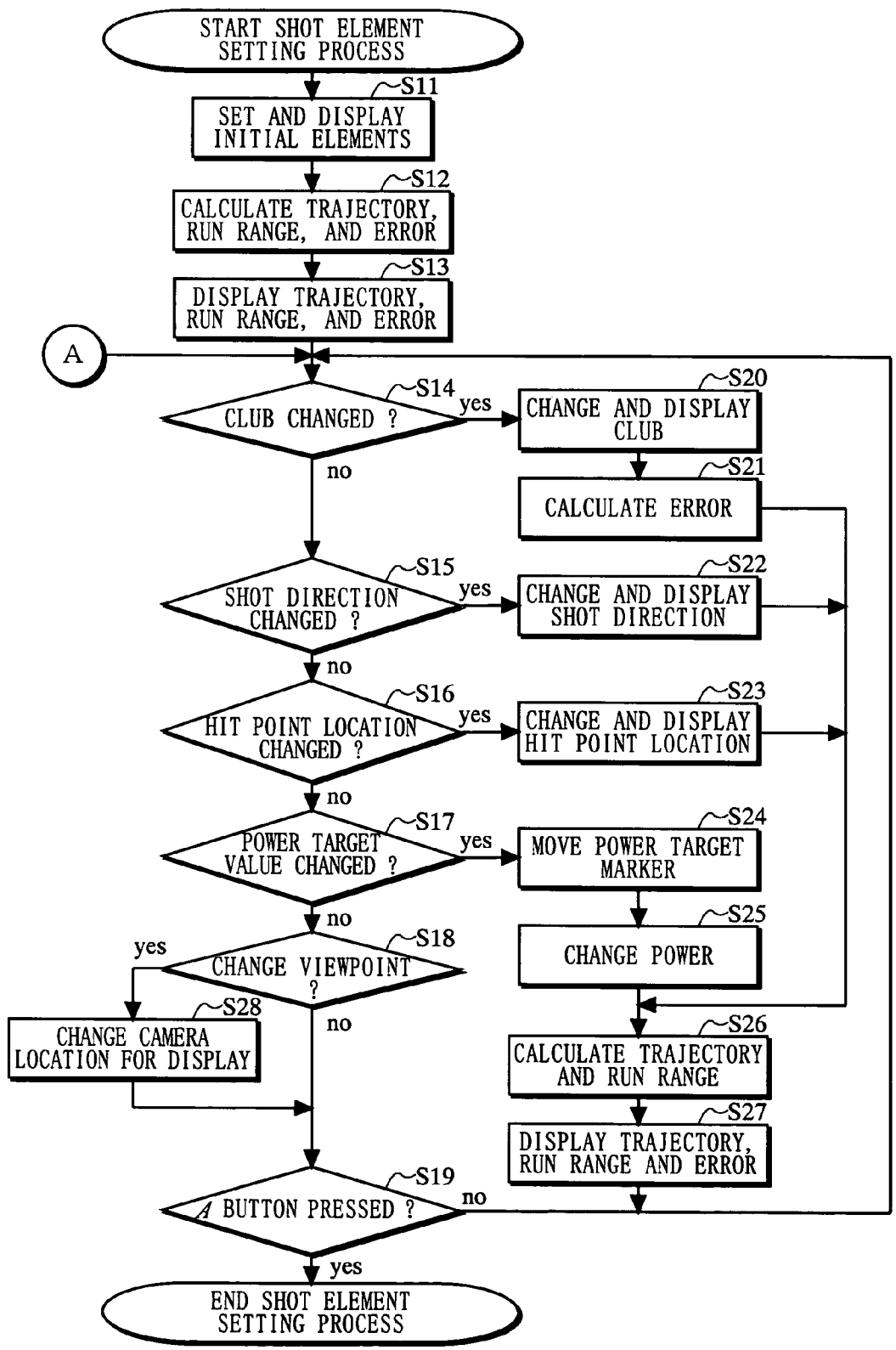
FIG. 8 illustrates the details of a subroutine of step S1 shown in FIG. 7.
Figure 9:
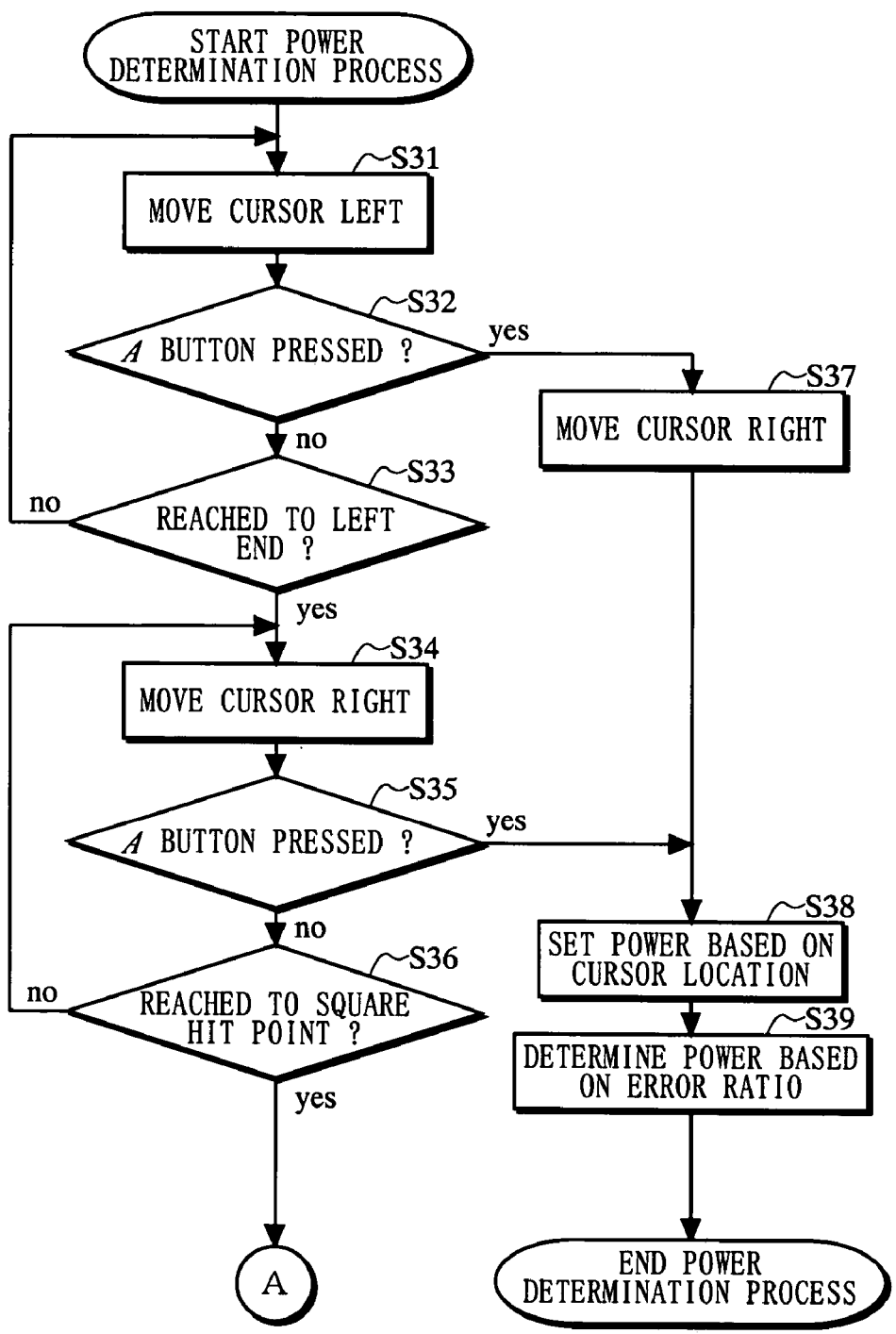
FIG. 9 illustrates the details of a subroutine of step S2 shown in FIG. 7.
Figure 10:
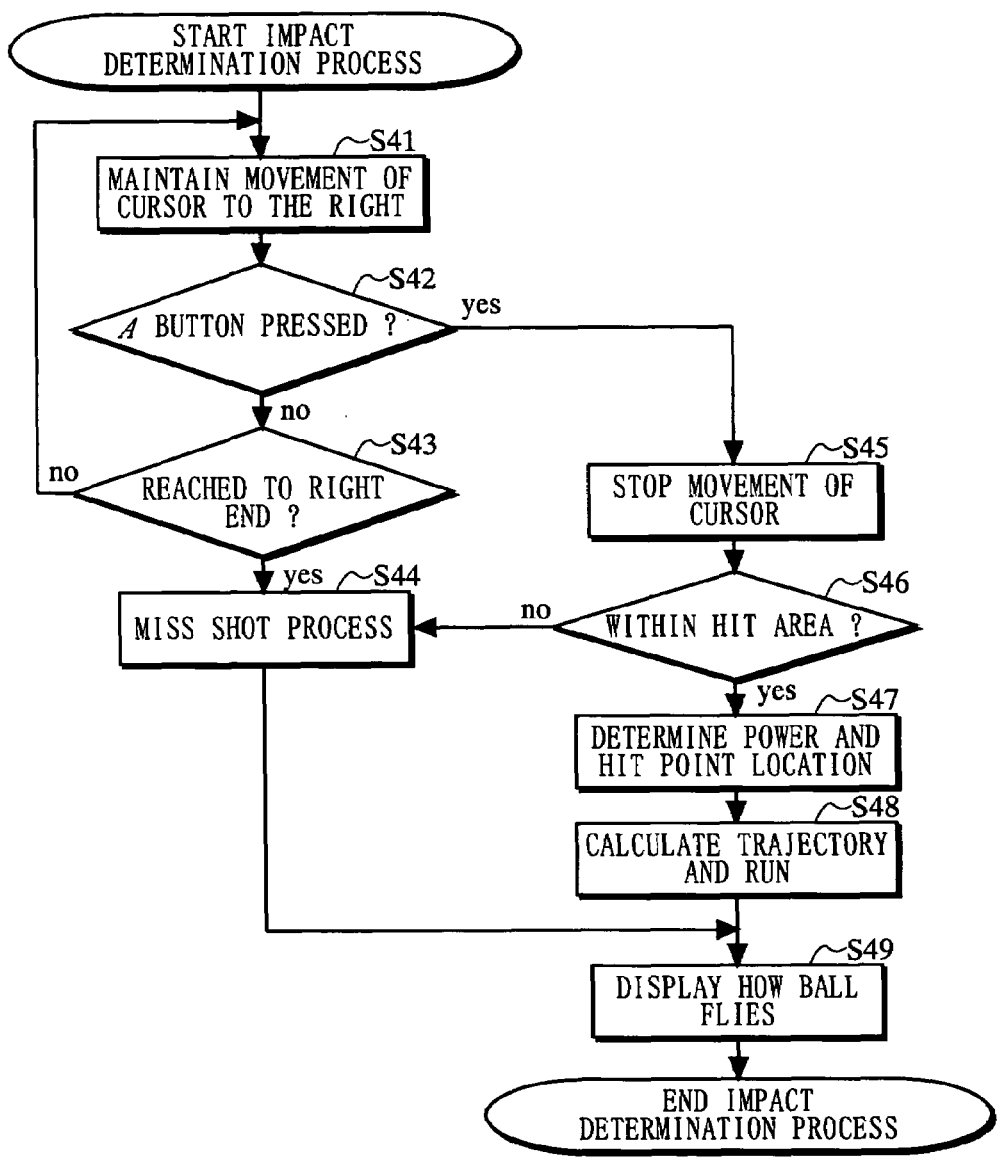
FIG. 10 illustrates the details of a subroutine of step S3 shown in FIG. 7.

Referring to FIGS. 7 to 10, described next is processing for the shot operation implemented by the game apparatus 3 of the game system 1. FIG. 7 is a flowchart illustrating the entire process of the shot processing implemented by the game apparatus 3. FIG. 8 illustrates the details of a shot element setting process which is a subroutine of the shot processing illustrated in FIG. 7. FIG. 9 illustrates the details of a power determination process which is a subroutine of the shot processing illustrated in FIG. 7. FIG. 10 illustrates the details of an impact location determination process which is a subroutine of the shot processing illustrated in FIG. 7.

Firstly, operations to be performed before the procedure shown in the flowchart of FIG. 7 are described with reference to FIG. 2. When the power of the game apparatus 3 is depressed, the CPU 31 of the game apparatus 3 implements a startup program stored in a boot ROM (not shown) to initialize units in the game apparatus 3, e.g., the work memory 32. Then, a golf game program stored in the optical disc 4 is read onto the work memory 32 via the optical disc drive 37. Implementation of the golf game program is started and a game space is represented on the television 2 via the GPU 36. Then, the golf game is started.

The player of the game apparatus 3 selects a desired one of plurality of optional courses for the golf game and a character for the player object 21 which the player desires to operate, while viewing game images displayed on the television 2. In order to make selections as described above, the player operates input portions provided on the controller 6 in a manner as described above. Then, a game image 20 is displayed on the television 2 in accordance with the course and character selected by the player (see FIG. 3).

Referring to FIG. 7, the CPU 31 sets shot elements for a hole currently represented on the television 2 (step S1). As described above, the shot elements to be set before the shot operation is performed include a club to be used, a target value of a power for hitting the ball 22, a shot direction, and a hit point location.

Next, the CPU 31 determines a shot power (step S2). In this power determination process, the player operates the A button 62 while viewing a movement of the cursor 24 within the power gauge 24 in the game image (see FIGS. 5A to 5C), and the CPU 31 determines the shot power in accordance with the timing of the player's operation.

Next, the CPU 31 determines an impact location for the shot, and represents the trajectory and run of the ball 22 to be hit on the television 2 based on the shot elements set at step S1, the shot power determined at step S2, and the determined impact location (step S3). In this impact location determination process, the player operates the A button 62 while viewing a movement of the cursor 244 within the power gauge 24 in the game image (see FIGS. 5C to 5E), and the CPU 31 determines the impact location in accordance with the player's operation. The CPU 31 terminates the shot processing after the process of step S3. In order to make the golf game progress, the shot processing is repeatedly performed during play of the golf game.

Referring to FIG. 8, the procedure for setting the shot elements at the above step S1 is described in detail below. In FIG. 8, the CPU 31 sets the shot elements at their respective default values based on, for example, a current distance from the ball 22 to a pin 23 (FIG. 3) and the status of a lie of the ball 22, and displays the thus-set shot elements (step S11). For example, the club to be used is properly set based on the current distance to the pin 23 and the status of the lie of the ball 22, i.e., a driver (1W) is set as a proper club for a tee shot on a long hole, or a sand wedge (SW) is set as a proper club for a bunker shot. The proper club to be used is displayed in the selected club display object 27 (see FIG. 3). A shot direction is typically set as a target direction extending between the current ball 22 and the pin 23, and represented by moving the background image right or left with respect to the player object 21. The hit point location for a shot is set at the center of the ball 22, and displayed in the hit point object 25. A target value of the shot power is set at a maximum possible level of the shot power of the proper club, and is displayed using the power target marker 241.

Then, the CPU 31 calculates estimated trajectory data, estimated run range data, and error ratio data for each of the estimated trajectory and the estimated run range based on the shot elements set at the above step S11 (step S12). Here, data used by the CPU 31 for the calculation as described above includes the shot elements set at step S11 (club data indicating the club to be used, shot direction data indicating the direction to which a ball is hit, hit point location data indicating the hit point location, and power target value data), current ball location data, a club table, a trajectory variation table, geographic data, and an error ratio table. In order to calculate final trajectory data in the shot processing, it is necessary to determine the shot power and the impact location in accordance with an operation timing at which the player conducts the shot operation. However, in the calculation of the estimated trajectory data at the above step S12, the power target value data is used for the shot power, and the impact location is considered as corresponding to a square hit point. Note that the power target value data indicates a power currently set as the target value, e.g., as a percentage of maximum possible power.

The ball location data indicates the current location of the ball 22 in the game space, where the golf game is currently played, using a three-dimensional coordinate point. In the club table, for each character, a travel distance and a vertical distance for a shot with a maximum possible power is defined with respect to each of combinations of club numbers and statuses of lies set in the golf game. In the trajectory variation table, variation of a trajectory in accordance with hit point locations are defined. As described above, the hit point locations are defined with reference to the center of the ball 22. The geographic data indicates geographic features represented in the game space, and the geographic features to be indicated include undulations of the entire hole, statuses of lies in various types of grounds, and obstacles such as trees. The geographic data also indicates influences caused on the ball 22 in contact with the geographic features (e.g., bound coefficients, decreasing rates of runs, influences by inclination, etc.). As illustrated in FIGS. 11 and 12, the error ratio data indicates error ratios set for characters, lies, and club numbers. These error ratios indicate degrees of deviations of a final trajectory in the shot processing from an estimated trajectory. By setting characters so as to have their own error ratios based on various possible lies as shown in FIG. 11, the characters can have different shooting characteristics, thereby adding an additional game-like nature to the golf game. For example, in FIG. 11., character A is good at fairway shots, and character C is good at bunker shots. Note that the club table, the trajectory variation table, the geographic data, and the error ratio table are included in a game program prestored in the optical disc 4. These tables and data are read by the CPU 31 in accordance with the progress of the game program, and stored in the work memory 32 on timely occasions.

The CPU 31 calculates the estimated trajectory data based on the set shot elements (the club to be used, the shot direction, the hit point location, the power target value) with reference to the club table, the trajectory variation table, the geographic data, and the error ratio table. For example, in order to calculate basic trajectory data, which represents a trajectory from a coordinate point of a current ball location, on the assumption that the ball is hit when the impact location corresponds to the square hit point 243, the CPU 31 uses: a travel distance and a vertical distance which are determined based on the selected club, the selected character, and the lie; vector data corresponding to the selected shot direction; and the trajectory variation data corresponding to the selected hit point location. Then, the CPU 31 calculated the estimated trajectory data by multiplying the basic trajectory by a percentage indicated by the power target value data.

The CPU 31 also calculates the error ratio data in accordance with the character, which is currently selected as the player object 21, the club to be used for a shot, and the lie at which the ball is currently located. Specifically, error ratios corresponding to the current conditions (the character, the club, and the lie) are extracted from the data tables related to the error ratios illustrated in FIGS. 11 and 12, and the error ratios are added together to obtain the error ratio data. Even when the shot power is determined so as to be equal to the power target value in the impact location determination process of step S2 and the square hit point 243 is determined in the impact location determination process of step S3, the error ratio data indicates a percentage by which the actual trajectory deviates from the estimated trajectory. In the golf game of the present embodiment, there is a possibility that the actual trajectory might deviate from the estimated trajectory even if the player performs precise operations in both the power determination process and the impact location determination process. That is, the error ratio data indicates a maximum possible percentage by which the actual trajectory can deviate from the estimated trajectory if such deviation occurs.

The CPU 31 also calculates estimated ball landing point data which corresponds to a terminal coordinate point in the estimated trajectory data, and further calculates, based on the above-described error ratio data, a variation range of a ball landing point (hereinafter, referred to as the "estimated ball landing range"), where coordinates of an estimated ball landing point are located at the center. Then, the CPU 31 references the estimated ball landing range, and calculates estimated run range data based on geographic data about geographic features in the vicinity of the estimated ball landing range. For example, the CPU 31 calculates the estimated run range data, which indicates an estimated run range from the estimated ball landing range, using an angle of the estimated trajectory to the estimated ball landing point, a variation of the run corresponding to the selected hit point location, and the influence of the geographic data on the ball. The estimated run range data represents a run range obtained by calculation using a set of coordinates along a geographic feature represented by the run range. For example, in the case where the estimated run range has a rectangular shape, the estimated run range is represented by a set of coordinate points each indicating a corresponding one of four corners of the rectangle. Note that the burden on a calculation process is reduced by using an estimated ball landing point as a reference and displaying a previously prepared estimated run range having a predetermined shape, rather than by determining the estimated run range via calculation and displaying the determined estimate run range.

Figure 13:
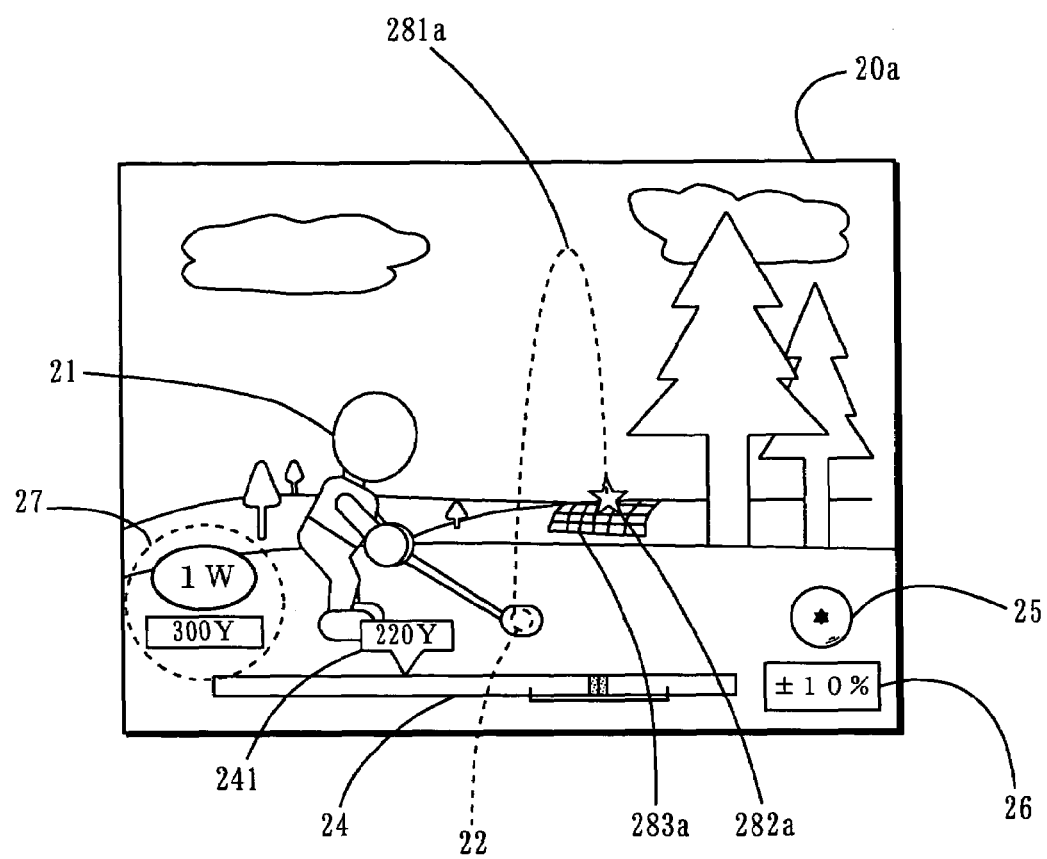
FIG. 13 illustrates an example of a game image 20a displayed on a television 2 at step S13 shown in FIG. 8.

Next, the CPU 31 displays a game image based on the estimated trajectory data, the estimated run range data, and the error ratio data which are calculated at the above step S12 (step S13). FIG. 13 illustrates an example of a game image 20*a* displayed on the television 2 at step S13.

In FIG. 13, the displayed game image 20*a* includes the player object 21, the ball 22, the power gauge 24, the power target marker 241, the hit point object 25, the error display object 26, and the selected club display object 27, as well as a background image as a current target of the game displayed in front of the player object 21. At step S13, an estimated trajectory 281*a*, an estimated ball landing point 282*a*, an estimated run range 283*a*, and an error display object 26 are also displayed. The hit point object 25, the error display object 26, and the selected club display object 27 are displayed based on the currently set shot elements. Although at default setting, the power target marker 241 is displayed at a location which indicates a maximum possible power (i.e., at the left end 24*e* of the power gauge 24), the power target marker 241 illustrated in FIG. 13 is displayed at a different location in order to show the state where the power target value is changed at step S17 as described later.

The estimated trajectory 281*a* and the estimated ball landing point 282*a*, which are displayed on the game image 20*a*, are displayed based on the estimated trajectory data and the estimated ball landing point data which are calculated at step S13. The estimated ball landing point 282*a* is displayed as, for example, a star mark, in the game space of the game image 20*a* which corresponds to the terminal coordinate point in the estimated trajectory data calculated at step S12. The estimated trajectory 281*a* is displayed so as to extend between the current ball 22 and the estimated ball landing point 282*a* to form a shape based on the estimated trajectory data. For example, an estimation of the trajectory of the ball 22 in the shot processing is displayed by a broken line. The estimated run range 283*a* displayed on the game image 20*a* is displayed in the game space of the game image 20*a* which corresponds to coordinates indicated by the estimated run range data calculated at step S13. For example, the estimated run range 283*a* is displayed in the shape of a rectangular area, which is divided into a plurality of equal-sized mesh parts, in accordance with geographic undulations.

Next, the CPU 31 determines whether the shot elements have been changed by the player's operation (steps S14 to S17). These determinations are performed by identifying input portions of the controller 6 operated by the player. For example, the CPU 31 determines: whether the player moved the main stick 61 up or down to determine whether the club to be used has been changed (step S14); whether the player moved the main stick 61 right or left to determine whether the shot direction has been changed (step S15); whether the player pressed up, down, right, or left of the cross key 67 to determine whether the ball hit point location has been changed (step S16); and whether the player pressed the R button 66a or the L button 66b to determine whether the power target value has been changed (step S17).

In the case where it is determined that the club to be used has been changed at step S14, the CPU 31 changes club data associated with the currently set shot elements, as well as the display of the selected club display object 27 (step S20) Then, the CPU 31 recalculates the above-described error ratio data using an error ratio shown in the error ratio table (see FIG. 12) for a new club (step S21), and then the procedure proceeds to the next step S26.

In the case where it is determined that the shot direction has been changed at step S15, the CPU 31 changes direction data associated with the currently set shot elements and moves the background image right or left with respect to the player object 21 so as to represent the new target direction (step S22). Then, the procedure proceeds to the next step S26.

In the case where it is determined that the hit point location has been changed at step S16, the CPU 31 changes hit point location data associated with the currently set shot elements so as to change the location at which the hit point location object 252 is displayed in the hit point object 25 (step S23). Then, the procedure proceeds to the next step S26.

Figure 14A:
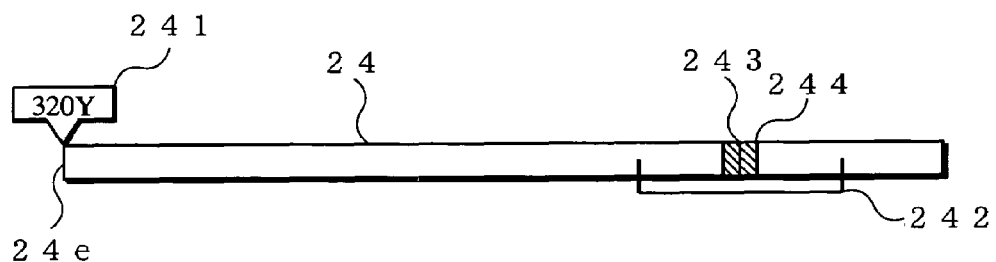
FIG. 14A is a diagram used for explaining how the location of a power target marker 241 displayed in a power gauge 24 is changed at step S24 shown in FIG. 8.
Figure 14B:
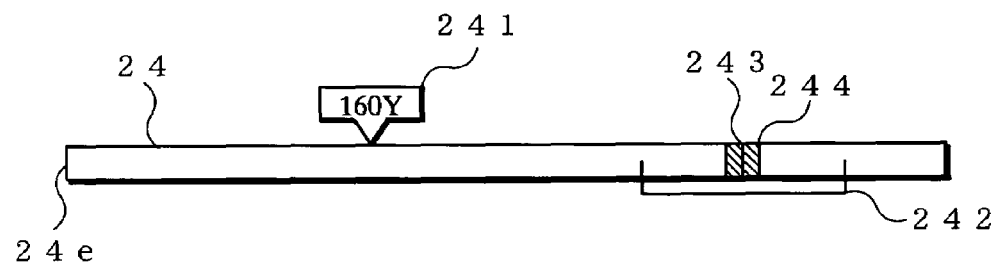
FIG. 14B is another diagram used for explaining how the location of the power target marker 241 displayed in the power gauge 24 is changed at step S24 shown in FIG. 8.
Figure 14C:
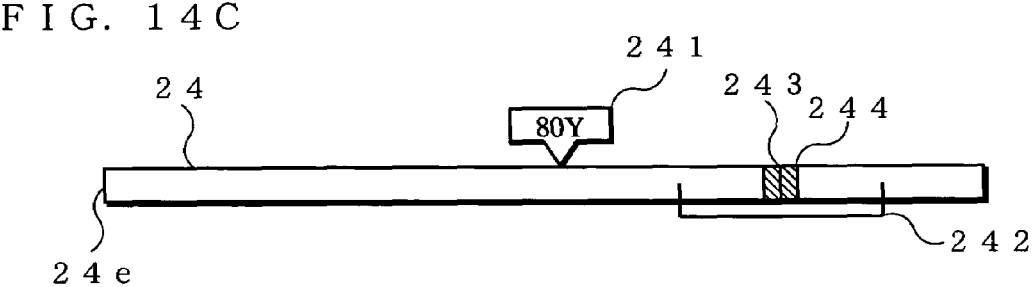
FIG. 14C is still another diagram used for explaining how the location of the power target marker 241 displayed in the power gauge 24 is changed at step S24 shown in FIG. 8.

In the case where it is determined that the target power value has been changed at step S17, the CPU 31 changes the location at which the power target marker 241 is displayed (step S24), and also changes power target value data associated with the currently set shot elements (step S25). Then, the procedure proceeds to the next step S26. FIGS. 14A through 14C are diagrams used for explaining how the location of the power target marker 241 displayed in the power gauge 24 is changed at step S24.

FIG. 14A illustrates the state where the power target value is set at a default value at the above step S11. As described above, the default value of the power target value is set at a maximum possible level of the shot power of the selected club, and therefore the power target marker 241 is displayed at the left end 24e indicating the maximum power in the power gauge 24. In the internal area of the power target marker 241, a travel distance "320Y" for a shot at the power target value is displayed. The travel distance is calculated on the assumption that the impact location lies over the square hit point 243.

FIG. 14B illustrates the state where the power target marker 241 illustrated in FIG. 14A, which is displayed at the left end 24e indicating the maximum power in the power gauge 24, is moved to a location, where the power is reduced to about 50% of the maximum power, by the player operating the R button 66a. In the internal area of the power target marker 241, a travel distance "160Y" for a shot at the power target value corresponding to the location of the power target marker 241 (i.e., a travel distance for a shot at the power of about 50% of the maximum power) is displayed.

FIG. 14C illustrates the state where the power target marker 241 illustrated in FIG. 14B, which is displayed at the location indicating about 50% of the maximum power in the power gauge 24, is further moved to a location, where the power is reduced to about 25% of the maximum power, by the player operating the R button 66a again. In the internal area of the power target marker 241, a travel distance "80Y" for a shot at the power target value corresponding to the location of the power target marker 241 (i.e., a travel distance for a shot at the power of about 25% of the maximum power) is displayed.

As described above, the power target marker 241 is moved right along the power gauge 24 by the player operating the R button 66a, and can display a travel distance in accordance with the power target value indicated by the location to which the power target marker 241 has been moved. The power target marker 241 is also moved left by the player operating the L button 66b. That is, the player can change the power target value by moving the power target marker 241 before the shot operation is performed, and can recognize a travel distance for a shot at the changed power target value.

Note that the power target marker 241 may be continuously moved right or left by pressing the R button 66a or the L button 66b (in this case, the power target value is continuously changed), or may be set such that the power target value jumps from one prescribed fixed value to another each time the R button 66a or the L button 66b is pressed. For example, each press of the R button 66a changes the power target value in a decreasing manner, such as "100%"→"80%"→"60%"→"40%"→"20%", and each press of the L button 66b changes the power target value in an increasing manner, such as "20%"→"40%"→"60%"→"80%"→"100%".

In the case where it is determined that no shot elements have been changed by the player's operation in the processing at steps S14 to S17, the CPU 31 determines whether to make a change in a viewpoint to the current game image 20a (step S18). The determination is also performed by identifying input portions of the controller 6 operated by the player. For example, the CPU 31 determines whether the player moved the C stick 68 up, down, right, or left to determine whether to make a change in a viewpoint. If it is determined that the viewpoint should be changed at step S18, then the CPU 31 changes the location of a virtual camera for capturing a game image in accordance with a direction to which the player moves the C stick 68, and creates a new game image (step S28). Then, the procedure proceeds to the next step S19. On the other hand, if it is determined that the viewpoint should not be changed at step S18, the procedure proceeds to the next step S19.

Figure 15:
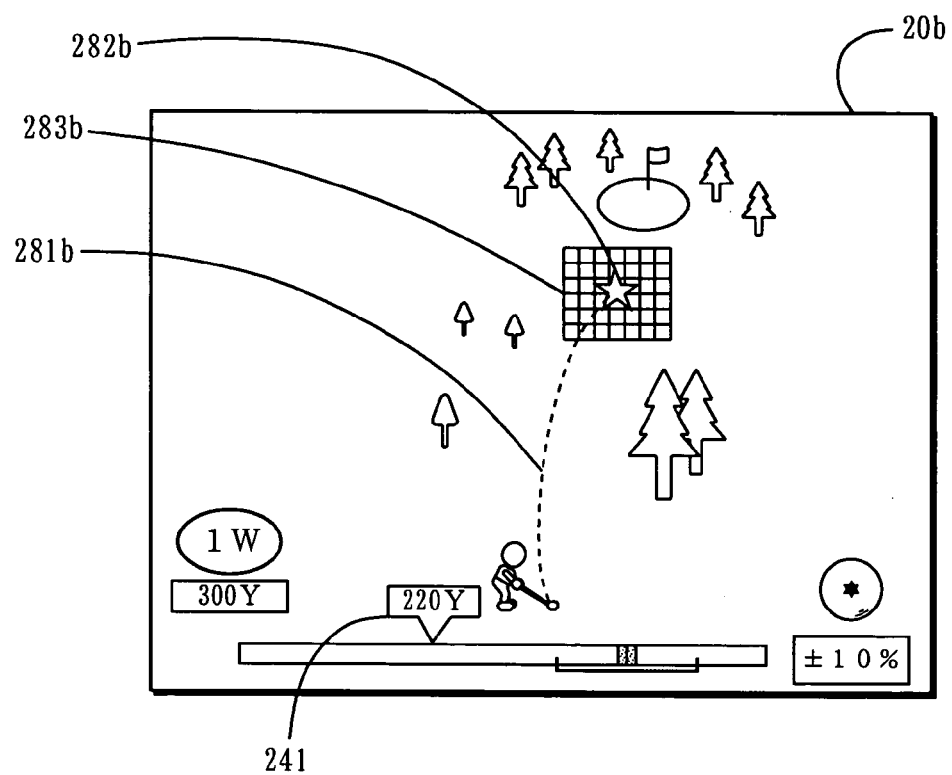
FIG. 15 illustrates an example of a game image 20b obtained when the camera location for the game image 20a illustrated in FIG. 13 is changed at step S18 in FIG. 8.
Figure 16:
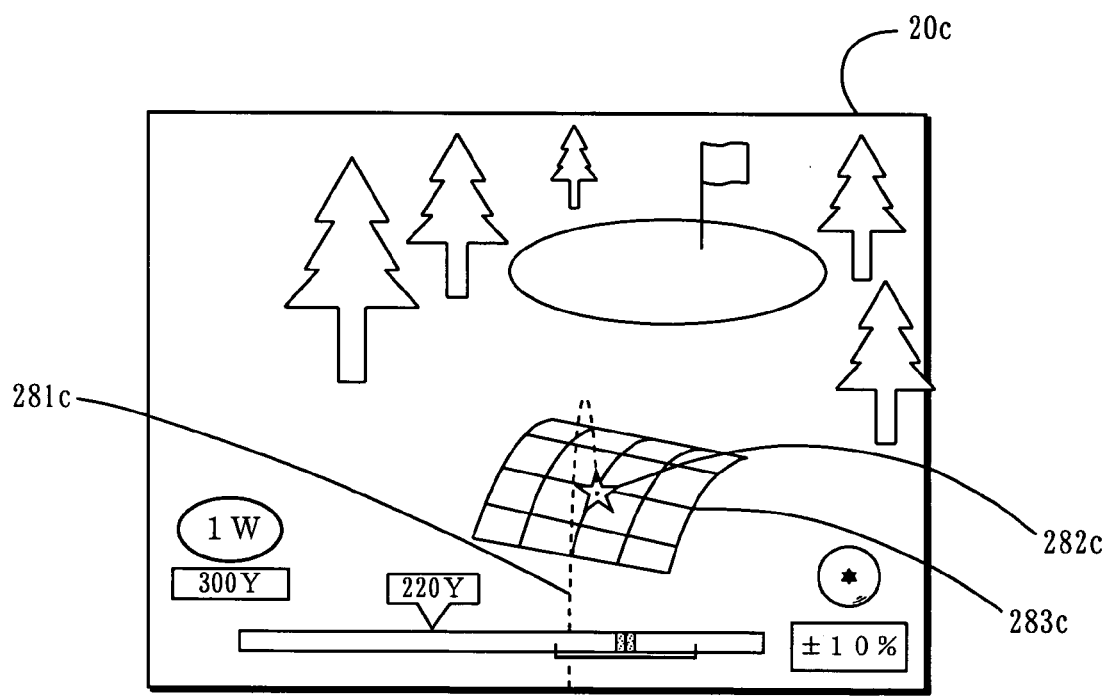
FIG. 16 illustrates an example of a game image 20c obtained when the camera location for the game image 20a illustrated in FIG. 13 is changed at step S18 in FIG. 8.

FIGS. 15 and 16 each illustrate an exemplary game image obtained when the camera location for the game image 20a illustrated in FIG. 13 is changed at step S18. A game image 20b illustrated in FIG. 15 is obtained when the camera location is changed by the player moving the C stick 68 down. In the game image 20b, the power gauge 24, the power target marker 241, the hit point object 25, the error display object 26, and the selected club display object 27 are displayed in the same manner as displayed in the game image 20a. Displays of the player object 21, the estimated trajectory 281b, the estimated ball landing point 282b, and the estimated run range 283b are changed along with a change of the background image in accordance with the change of the camera location. Specifically, when the C stick 68 is moved down in the state where the game image 20a is displayed, the camera location is changed so as to move opposite to the direction of the estimated trajectory 281a while moving up, thereby obtaining the game image 20b which is a bird's eye view as seen from a viewpoint above and behind the player object 21. Such a change of the camera location allows the player to confirm, by means of the game image 20b, the estimated trajectory 281b, the estimated ball landing point 282b, and the estimated run range 283b with respect to the entire course.

A game image 20c illustrated in FIG. 16 is obtained when the camera location is changed by the player moving the C stick 68 up. In the game image 20c, the power gauge 24, the power target marker 241, the hit point object 25, the error display object 26, and the selected club display object 27 are displayed in the same manner as displayed in the game image 20a. Displays of the player object 21, the estimated trajectory 281c, the estimated ball landing point 282c, and the estimated run range 283c are changed along with a change of the background image in accordance with the change of the camera location. Specifically, when the C stick 68 is moved up in the state where the game image 20a is displayed, the viewpoint is changed as if the virtual camera is gradually moving to a direction toward the estimated ball landing point 282c along the estimated trajectory 281c, so that on-the-spot game images are generated based on locations of the virtual camera. When the player stops operating the C stick 68, the movement of the virtual camera is also stopped. Therefore, the game image 20c is created in accordance with the location at which the movement of the virtual camera is stopped. In the case where the C stick 68 is continuously operated so as to be kept in the "up" position, the virtual camera is eventually located in the vicinity of the estimated ball landing point 282c, so that the situation in the vicinity of the estimated ball landing point 282c is displayed as a game image as illustrated as the game image 20c. Alternatively, the movement of the virtual camera may be controlled, for example, such that when the X button 64 is pressed, the virtual camera is automatically and continuously moved to the direction toward the estimated ball landing point 282c along the estimated trajectory 281c, so that the game image is automatically shifted from the game image 20a to the game image 20c. Such movement of the virtual camera allows the player to view, in the game image 20c, the course seen from the estimated trajectory 281c of the ball 22 to be hit, whereby the player can confirm the detailed situation of the course in the vicinity of the estimated ball landing point 282c and the estimated run range 281c. Further, the player can confirm the details of an obstacle located in the vicinity of the estimated trajectory 281c by viewing a game image during the shift from the game image 20a to the game image 20c, whereby it is possible to previously consider a risk of contact with that obstacle, for example.

When the C stick 68 is moved right or left in the state where the game image 20a is displayed, the viewpoint is changed as if the virtual camera is moving to a location from which a side view of the estimated trajectory 281a can be seen. Such movement of the virtual camera allows the player to stereoscopically view the estimated trajectory 281a of the ball 22 to be hit, whereby it is possible to confirm what kind of geographic vicinity the estimated trajectory 281c passes through.

Referring to FIG. 8, at step S26, the CPU 31 uses a shot element newly changed at step S20, S21, S22, S23, or S25 to recalculate the estimated trajectory data and the estimated run range data. Such recalculation is performed in a manner similar to the calculation at step S12, and therefore detailed description thereof is omitted.

Then, the CPU 31 displays a game image based on the estimated trajectory data and the estimated run range which are obtained by the recalculation at step S26 (step S27). At step S27, a process similar to that of step S13 is performed.

A change of the game image due to a change of the shot element is described in detail below.

As described above, the estimated trajectory data calculated by the CPU 31 is obtained by multiplying the basic trajectory data by a percentage indicated by the power target value data. That is, when the power target value is changed by the player, a travel distance indicated by the estimated trajectory is also changed in accordance with that percentage. For example, in the game image 20b illustrated in FIG. 15, the power target marker 241 is displayed at the location indicating a travel distance "220Y" as a power target value, and the estimated trajectory 281b, the estimated ball landing point 282b, and the estimated run range 283b are displayed in accordance with that power target value. FIG. 17 illustrates a game image 20d in which the power target marker 241 is moved to a location, which indicates a travel distance "150Y" as a power target value, from the location of the power target marker 241 displayed in the game image 20b illustrated in FIG. 15, and an estimated trajectory 281d, an estimated ball landing point 282d, and an estimated run range 283d are displayed in accordance with that power target value. Comparing the game image 20b with the game image 20d, it is found that in the game image 20d, where the power target value indicates a reduced power, the travel distance indicated by the estimated trajectory 281d is displayed as being short, and it is also found that the estimated ball landing point 282d and the estimated run range 283d are displayed at locations closer to the player object 21 in a manner consistent with the display of such a short travel distance. The player can freely set a power target value by operating the R button 66a or the L button 66b, and therefore it is possible to readily recognize the estimated trajectory 281d for a shot at the power indicated by that power target value, so that the player is facilitated to plan a strategy for conquering a hole in the golf game.

Described next is a case where the CPU 31 calculates estimated trajectory data of an estimated trajectory which intersects an obstacle, such as a tree, indicated by geographic data. When part of coordinate data of a game space indicated by calculated estimated trajectory corresponds to coordinate data of the obstacle indicated by the geographic data, the CPU 31 uses a bound coefficient of the obstacle to calculate how the ball 22 bounces off the obstacle. Specifically, in this calculation, the CPU 31 calculates estimated trajectory data of an estimated trajectory whose direction is changed by the obstacle. The CPU 31 uses the estimated trajectory data to calculate the estimated ball landing point data and the estimated run range data.

Figure 18:
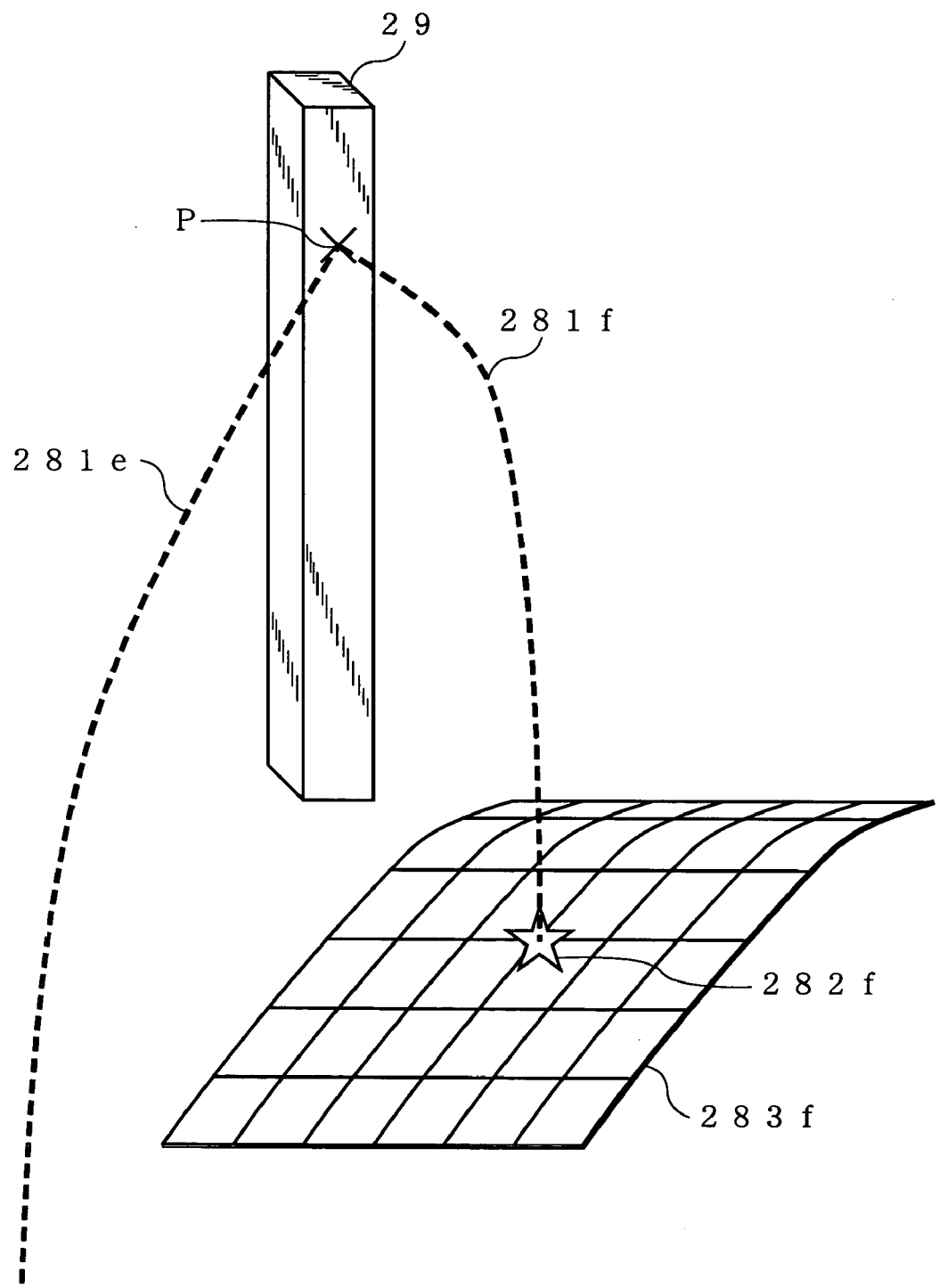
FIG. 18 illustrates an exemplary game image displayed when an estimated trajectory intersects an obstacle, such as a tree, represented by geographic data.

FIG. 18 illustrates an exemplary game image displayed is good at fairway shots, and character s a result of the above-described calculation. In FIG. 18, when an estimated trajectory 281e intersects an obstacle 29 at point P, an estimated trajectory 281f bouncing off the point P is displayed. Also, an estimated ball landing point 282f at which a ball traveling along the estimated trajectory 281f lands, and an estimated run range 283f are displayed. Therefore, when a shot element is changed, the player can readily determine whether a trajectory estimated based on the change of the shot element is blocked by an obstacle, so that the player is facilitated to plan a strategy for conquering a hole in the golf game.

Alternatively, a marker indicating an intersection at a point where the estimated trajectory meets the obstacle may be displayed. In this case, the player clearly recognizes that the estimated trajectory is blocked by the obstacle. The player also recognizes the intersection. Even in the case where the estimated trajectory does not intersect the obstacle, when there is an obstacle in the vicinity of the estimated trajectory, a marker indicating the risk of blockage by the obstacle may be displayed on a portion of the estimated trajectory which is located near the obstacle or on the obstacle itself. In this case, the player can recognize that there is a possibility that a ball might be obstructed by the obstacle when the ball moves out of the estimated trajectory due to a misoperation or the like.

Referring to FIG. 8, at step S19, the CPU 31 determines whether the A button 62 has been operated by the player. When it is determined that the A button 62 has not been operated by the player, the procedure returns to step S14 and the CPU 31 repeats the process of step S14. When it is determined that the A button 62 has been depressed, the subroutine for the shot element setting process is terminated and the procedure proceeds to step S2 shown in FIG. 7.

Referring to FIG. 9, the procedure of the power determination process of step S2 shown in FIG. 7 is described in detail below. In FIG. 9, the CPU 31 moves the cursor 244 located within the power gauge 24 to the left along the power gauge 24 (step S31; see FIG. 4B or 5B), and waits for the player to operate the A button 62 (step S32). When the A button 62 is depressed by the player, the procedure proceeds to the next step S37.

At step S37, the CPU 31 reverses the movement of the cursor 244 so that the cursor 244 moves right along the power gauge 24 (see FIG. 5C), and the procedure proceeds to the next step S38.

If the A button is not operated by the player at the above step S32, the procedure proceeds to the next step S33. At step S33, the CPU 31 determines whether the cursor 244 has reached the left end 24e of the power gauge 24 (see FIG. 4C). When it is determined that the cursor 244 has not reached the left end 24e of the power gauge 24, the procedure returns to step S31 and the CPU 31 repeats the process of step S31. On the other hand, when it is determined that the cursor 244 has reached the left end 24e of the power gauge 24, the CPU 31 reverses the movement of the cursor 244 at the left end 24e so that the cursor 244 moves right along the power gauge 24 (step S34; see FIG. 4C), and waits for the player to operate the A button 62 (step S35). At step S35, if the A button 62 is depressed by the player, the procedure proceeds to the next step S38, and if not, the procedure proceeds to the next step S36.

Note that when the player operates the A button 62 at the above step S32 or S35, the player references the power target marker 241 (see, for example, FIG. 3) attached to the power gauge 24 as an index of an operation timing. Although the player might neglect the power target marker 241 to select an arbitrary power, e.g., a maximum possible power, the player is required to depress the A button 62 at a location indicated by the power target marker 241 in order to make a shot such that the ball travels along an estimated trajectory as described above.

If the A button is not operated by the player at step S35, the CPU 31 determines, at step S36, whether the cursor 244 has reached the square hit point 243 (see FIG. 4D). When it is determined that the cursor 244 has not reached the square hit point 243, the procedure returns to step S34 and the CPU 31 repeats the process of step S34. On the other hand, when it is determined that the cursor 244 has reached the square hit point 243 of the power gauge 24, the procedure returns to step S14 shown in FIG. 8 and the CPU 31 repeats the shot element setting process.

If the A button 62 is depressed by the player at step S35, the CPU 31 sets, at step S38, a shot power based on the location of the cursor 244 (see outline arrow $A_{t2}$ shown in FIG. 5C) at the time the A button 62 is depressed by the player. As described above, the shot power, which is set in accordance with the location of the cursor 244, becomes larger as the location of the cursor 244 at the time the A button 62 is depressed becomes closer to the left edge 24e, i.e., 100% power is set by depressing the A button 62 when the cursor 24 lies at the left edge 24e. The power to be set is decreased at a prescribed rate as the cursor 244 moves right away from the left edge 24e.

The CPU 31 adjusts the shot power set at step S38 in accordance with a currently set error ratio and a random number value, and determines the shot power (step S39). Then, the CPU 31 terminates the subroutine for the power determination process, and the procedure proceeds to step S3 shown in FIG. 7. Specifically, at step S39, the value of the shot power is determined in accordance with the random number value so as to fall within the limit of the currently set error ratio. For example, in the case where the currently set error ratio is ±10%, any value falling within the range of the power set at step S38 plus and minus 10% is selected and determined in accordance with a random number value.

Referring to FIG. 10, the procedure of the impact determination process of step S3 shown in FIG. 7 is described in detail below. In FIG. 10, the CPU 31 still maintains the movement of the cursor 244 located within the power gauge 24 to the right after the above-described power determination process (step S41), and waits for the player to operate the A button 62 (step S42).

If the A button is operated by the player at step S42, the procedure proceeds to the next step S43. At step S43, the CPU 31 determines whether the cursor 244 has reached the right end of the power gauge 24. When it is determined that the cursor 244 has not reached the right end of the power gauge 24, the procedure returns to step S41 and the CPU 31 repeats the process of step S41. On the other hand, when it is determined that the cursor 244 has reached the right end of the power gauge 24, the procedure proceeds to step S44.

In the case where it is determined, at step S42, that the A button 62 has been depressed by the player, the procedure proceeds to the next step S45. At step S45, the CPU 31 stops the movement of the cursor 244 along the power gauge 24, and determines whether the location at which the cursor 244 is stopped lies within the hit area 242 (see FIG. 5D) or not (see FIG. 5E) (step S46). When it is determined, at step S46, that the location at which the cursor 244 is stopped lies within the hit area 242, the procedure proceeds to the next step S47. When it is determined, at step S46, that the location at which the cursor 244 is stopped is out of the hit area 242, the procedure proceeds to the next step S44.

At step S47, the CPU 31 determines a shot power and a hit point location in accordance with the location at which the cursor 244 is stopped at the above step S45. For example, when the cursor 244 lies over the square hit point 243 (see FIG. 4D), the CPU 31 considers that the ball is hit at the center with the sweet spot of the club, and determines that the shot power determined at the above step S39 and the currently set hit point location data can be used for the shot processing without requiring adjustment. Alternatively, when the cursor 244 is located left to the square hit point 243, the CPU 31 considers that the ball is hit by the club on the side deviating left from the center by a distance corresponding to the distance between the cursor 244 and the square hit point 243. In this case, the CPU 31 decreases the power determined at the above step S39 in accordance with that distance, and changes a currently set hit point location to the left in accordance with the same distance. Alternatively still, when the cursor 244 is located right to the square hit point 243, the CPU 31 considers that the ball is hit by the club on the side deviating right from the center by a distance corresponding to the distance between the cursor 244 and the square hit point 243. In this case, the CPU 31 decreases the power determined at the above step S39 in accordance with that distance, and changes a currently set hit point location to the right in accordance with the same distance.

Then, the CPU 31 calculates trajectory data and run data using, for example, setting data for each of the currently set shot elements (step S48), and the procedure proceeds to the next step S49. The data used by the CPU 31 for the calculation at step S48 includes data about a current ball location, the currently set shot elements (club data and direction data), the currently set error ratio data, data about the power and the hit point location which are determined at step S47, and geographic data.

The CPU 31 calculates a travel distance and a vertical distance in accordance with data about a selected club, a selected character, and a ball lie, and calculates trajectory data about a trajectory from a coordinate point for the current ball location using direction data corresponding to a selected target direction and trajectory variation data corresponding to data about the determined power and the determined hit point location. In some cases, the CPU 31 may calculate the trajectory data by changing the trajectory variation data within the range of the currently set error ratio data in accordance with a random number value. Following the calculation of the trajectory data, the CPU 31 calculates ball landing point data which corresponds to a terminal coordinate point in the trajectory data. Then, the CPU 31 references the ball landing point data, and calculates run data using geographic data about geographic features in the vicinity of the ball landing point. For example, the CPU 31 calculates run data, which indicates a run along geographic features from the ball landing point to a final ball reach location, by using an angle of the trajectory to the ball landing point, a variation of the run corresponding to the determined hit point location, and the influence of the geographic data on the ball. The trajectory data and the run data respectively represent the trajectory and the run, which are obtained by calculation, using a set of coordinates in the game space.

When it is determined, at the above step S46, that the location at which the cursor 244 is stopped is out of the hit area 242, the CPU 31 performs a miss shot process at step S44, and the procedure proceeds to the next step S49. For example, when the location at which the cursor 244 is stopped is out of the hit area 242, it is considered that: the club does not hit the ball; the club contacts the ball; or a duffed shot is hit. In such a case, the CPU 31 calculates trajectory data and run data, such that the current ball location is maintained or the ball drops in the vicinity of the current ball location.

At step S49, the CPU 31 represents as a game image on the television 2 how the ball is hit from the current location and rolls to the final reach location, based on the trajectory data and the run data which are calculated at the above step S48 or S44. Then, the CPU 31 terminates the subroutine for the impact location determination process.

As described above, the game apparatus of the present invention implements a game program, so that when the shot elements are set before a shot operation is performed, an estimated trajectory to an estimated ball landing point is displayed in accordance with the set shot elements. Therefore, the player can easily estimate the result of the shot operation. Further, a target value is set before the shot operation is performed with respect to a power element among the shot elements, and an estimated trajectory for the target value is displayed. Therefore, the player can recognize estimated trajectories for different powers, whereby, it is possible to know how much power is suitable for hitting a ball during the shot operation. Furthermore, in the case where the estimated trajectory intersects an obstacle, the displayed estimated trajectory represents the situation of the intersection with the obstacle, and therefore the player is facilitated to plan a strategy for conquering a hole. Further still, an error ratio is displayed for each of the estimated trajectory, the estimated ball landing point, and an estimated run range after the landing of a ball, and therefore the player can recognize that the estimation is not absolute, so that the player does not feel dissatisfaction with the result of the shot operation.

Figure 19A:
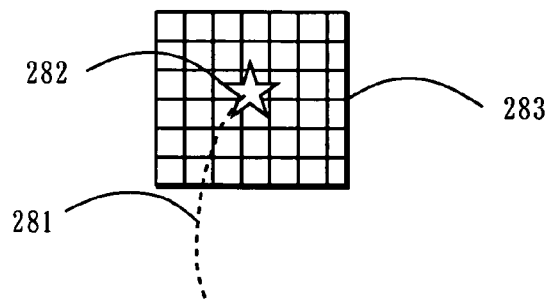
FIG. 19A is a diagram illustrating a first exemplary shape used for an estimated run range 283.
Figure 19B:
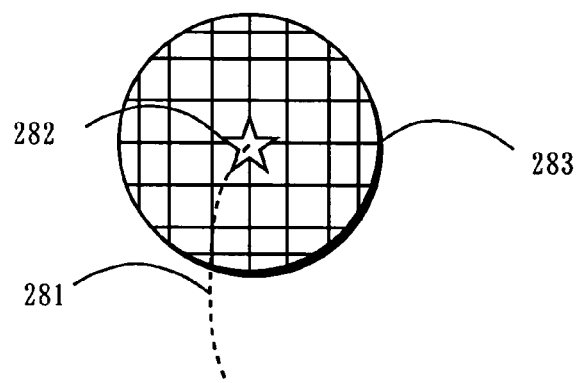
FIG. 19B is a diagram illustrating a second exemplary shape used for the estimated run range 283.
Figure 19C:
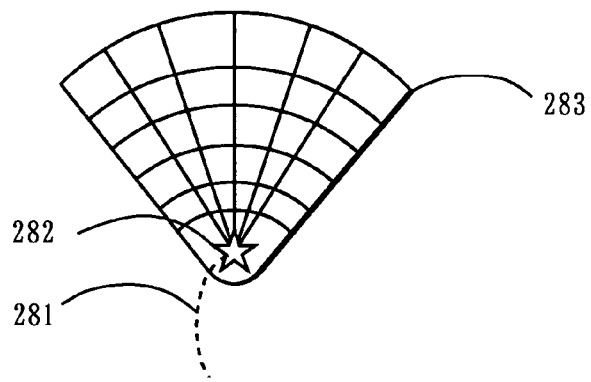
FIG. 19C is a diagram illustrating a third exemplary shape used for an estimated run range 283.
Figure 19D:
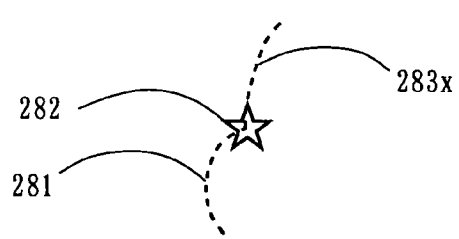
FIG. 19D is a diagram illustrating a fourth exemplary shape used for an estimated run trajectory 283x.

Although the estimated run range 283 has been described above as being rectangular as illustrated in FIG. 19A, the estimated run range 283 of the present invention is not limited to a rectangle. For example, the estimated run range 283 may be circular as illustrated in FIG. 19B or may be substantially fan-shaped as illustrated in FIG. 19C. Alternatively, instead of using the estimated run range 283, an estimated run trajectory 283x as illustrated in FIG. 19D may be used for representing an estimated trajectory along which a ball runs after landing.

Further, when the estimated trajectory or the estimated run range is calculated, influences on a ball exerted by the environment of a hole and undulations of a geographic feature on which the player object is positioned may be added as calculation elements. For example, trajectory variation data may be changed depending on a wind direction and a wind intensity. Further, a run distance may be shortened due to rain, etc. Furthermore, in the case where the player object is positioned on an uphill or downhill geographic feature, trajectory data may be changed such that the ball draws a trajectory so as to go hooking off to the left or go slicing off to the right.

Furthermore, although the movement of the cursor 244 along the power gauge 24 has been described above as being set so as to be reversed when the cursor 244 reaches the left end 24e of the power gauge 24, the movement of the cursor 24 is not limited to this. For example, when the cursor 244 reaches the left end 24e of the power gauge 24, the cursor 244 may repeat the movement to the same direction, i.e., to the left, from the right end.

Further still, although the details of input portions for setting shot elements and instructing temporary settings are provided in the above description, the present invention is not limited to the above-described input portions for providing various instructions. Any input portions included in the game apparatus for implementing the game program of the present invention can be enabled to provide any instructions by individually assigning instruction meanings to those input portions.

Further still, although the game type of the game program implemented by the game apparatus of the present invention has been described above as being a golf game, any type of games may be implemented by the game apparatus of the present invention. Similar effects as those as described above can be added to, for example, a game to which an additional game-like nature is added by displaying a trajectory, e.g., a fishing game, a soccer game, or a throwing game, such as a hammer throw.

Further still, although the game system has been described above as including a nonportable game apparatus, the present invention may be applied to any other type of suitable game apparatuses. For example, the present invention can be implemented on a portable game apparatus by using a plurality of input portions provided in the portable game apparatus, and also to even a typical computer system including a display section.

While the invention has been described in detail, the foregoing description is in all aspects illustrative and not restrictive. It is understood that numerous other modifications and variations can be devised without departing from the scope of the invention.

What is claimed is:

1. A game apparatus for displaying a golf game on a display and which operates in accordance with a player's input, comprising:
   an input section operated by the player;
   a shot element setting section for setting shot elements in accordance with a prescribed operation via the input section;
   a shot representing section for displaying a game image, which shows a ball being hit, based on the shot elements set by the shot element setting section during a shot operation;
   a shot element temporary setting section for temporarily setting at least one of the shot elements before a shot operation is performed; and
   an estimated trajectory display section for displaying, in a game image, an estimated trajectory to a landing point of a ball to be hit, based on the at least one of the shot elements temporarily set by the shot element temporary setting section before the shot operation is performed.

2. The game apparatus according to claim 1, wherein:
   the shot elements include first and second shot elements;
   the shot element setting section sets the first shot element before the shot operation is performed, and definitively sets the second shot element during the shot operation; and
   the shot element temporary setting section temporarily sets the second shot element before the shot operation is performed.

3. The game apparatus according to claim 1, wherein:
   the second shot element is fixed in accordance with a timing at which the input section is operated; and
   the shot element temporary setting section temporarily and selectively sets the second shot element from among a plurality of candidates.

4. The game apparatus according to claim 3, further comprising a target marker display control section for displaying, in the game image, a target marker indicating a timing corresponding to a candidate for the second shot element temporarily and selectively set by the shot element temporary setting section.

5. The game apparatus according to claim 4, further comprising a gauge display section for displaying, in the game image, a gauge having a longitudinal axis in one direction, and a cursor moving along the longitudinal axis of the gauge, wherein:
   the target marker display control section displays the target marker so as to be attached to the gauge at a location corresponding to the candidate temporarily and selectively set by the shot element temporary setting section; and
   the shot element setting section sets the second shot element based on a location of the cursor at the time the input section is operated while the cursor is moving along the longitudinal axis of the gauge.

6. The game apparatus according to claim 5, wherein the target marker indicates a target power for hitting a ball.

7. The game apparatus according to claim 1, wherein:
   the golf game is carried out in a virtual three-dimensional game space; and
   the estimated trajectory display section displays a game image obtained by moving a viewpoint of a virtual camera, which generates the game image, using the estimated trajectory as a reference in accordance with a prescribed operation via the input section.

8. The game apparatus according to claim 1, wherein the estimated trajectory display section displays, when the estimated trajectory intersects an obstacle, an intersection marker at an intersection of the estimated trajectory with the obstacle.

9. The game apparatus according to claim 1, wherein:
   the shot representing section changes a ball trajectory, which is represented in the game image based on the shot elements set by the shot element setting section, within a prescribed variation range based on a random number; and
   the estimated trajectory display section displays a display indicating the prescribed variation range in the game image.

10. The game apparatus according to claim 1, further comprising an estimated run range display section for displaying, in the game image, an estimated run range along which the ball travels on the ground from a landing point of the ball displayed by the estimated trajectory display section based on the shot elements temporarily set by the shot element temporary setting section when the shot operation is performed.

11. A game apparatus for displaying a game image for a game which moves an object in accordance with a player's input, comprising:
    an input section operated by the player;
    an object movement element setting section for setting object movement elements in accordance with a prescribed operation via the input section;
    an object movement representing section for displaying a game image, which shows that an object is moved, based on the object movement elements set by the object movement element setting section in an object movement operation;
    an object movement element temporary setting section for temporarily setting at least one of the object movement elements before the object movement operation is performed; and
    an estimated trajectory display section for displaying, in a game image, an estimated trajectory to a reach point of a moving object, based on the at least one of the object movement elements temporarily set by the object movement element temporary setting section before the object movement operation is performed.

12. A computer-readable recording medium having an executable game program recorded therein, the game program being implemented by a computer so as to represent on a display a golf game which operates in accordance with a player's input,
    wherein the game program causes the computer to perform:
    a shot element setting step of setting shot elements in accordance with a prescribed operation via an input section operated by the player;
    a shot representing step of representing a game image, which shows that a ball is hit, based on the shot elements definitively set by the shot element setting step during a shot operation;

a shot element temporary setting step of temporarily setting at least one of the shot elements before the shot operation is performed; and an estimated trajectory display step of displaying, in the game image, an estimated trajectory to a landing point of a ball to be hit, based on the at least one of the shot elements temporarily set by the shot element temporary setting step before the shot operation is performed.

13. The recording medium according to claim 12, wherein:

the shot elements includes first and second shot elements;

the shot element setting step sets the first shot element before the shot operation is performed, and definitively sets the second shot element during the shot operation; and the shot element temporary setting step temporarily sets the second shot element before the shot operation is performed.

14. The recording medium according to claim 13, wherein:

the second shot element is fixed in accordance with a timing at which the input section is operated; and the shot element temporary setting step temporarily and selectively sets the second shot element from among a plurality of candidates.

15. The recording medium according to claim 14, wherein the game program further causes the computer to perform a target marker display control step for displaying, in the game image, a target marker indicating a timing corresponding to a candidate for the second shot element temporarily and selectively set by the shot element temporary setting step.

16. The recording medium according to claim 15, wherein:

the game program further causes the computer to perform a gauge display step for displaying, in the game image, a gauge having a longitudinal axis in one direction, and a cursor moving along the longitudinal axis of the gauge;

the target marker display control step displays the target marker so as to be attached to the gauge at a location corresponding to the candidate temporarily and selectively set by the shot element temporary setting step; and the shot element setting step sets the second shot element based on a location of the cursor at the time the input section is operated while the cursor is moving along the longitudinal axis of the gauge.

17. The recording medium according to claim 16, wherein the target marker indicates a target power for hitting a ball.

18. The recording medium according to claim 12, wherein:

the golf game is carried out in a virtual three-dimensional game space; and the estimated trajectory display step displays a game image obtained by moving a viewpoint of a virtual camera, which generates the game image, using the estimated trajectory as a reference in accordance with a prescribed operation via the input section.

19. The recording medium according to claim 12, wherein the estimated trajectory display step displays, when the estimated trajectory intersects an obstacle, an intersection marker at an intersection of the estimated trajectory with the obstacle.

20. The recording medium according to claim 12, wherein:

the shot representing step changes a ball trajectory, which is represented in the game image based on the shot elements set by the shot element setting step, within a prescribed variation range based on a random number; and the estimated trajectory display step displays a display indicating the prescribed variation range in the game image.

21. The recording medium according to claim 12, further causing the computer to perform an estimated run range display step of displaying, in the game image, an estimated run range along which the ball travels on the ground from a landing point of the ball displayed by the estimated trajectory display section based on the shot elements temporarily set by the shot element temporary setting step before the shot operation is performed.

22. A computer-readable recording medium having an executable game program recorded therein, the game program being implemented by a computer so as to represent a game image on a display which an object is moved in accordance with a player's input, wherein the game program causes the computer to perform:

an object movement element setting step of setting object movement elements in accordance with a prescribed operation via an input section performed by the player;

an object movement representing step of representing a game image, which shows that an object is moved, based on the object movement elements set by the object movement element setting step in an object movement operation;

an object movement element temporary setting step of temporarily setting at least one of the object movement elements before the object movement operation is performed; and an estimated trajectory display step of displaying, in the game image, an estimated trajectory to a reach point of a moving object, based on the at least one of the object movement elements temporarily set by the object movement element temporary setting step before the object movement operation is performed.

* * * * *